(12) United States Patent
Vito et al.

(10) Patent No.: US 8,413,262 B2
(45) Date of Patent: *Apr. 9, 2013

(54) SOUND DISSIPATING MATERIAL

(75) Inventors: Robert A. Vito, Berwyn, PA (US); Carmen N. DiMario, West Chester, PA (US); Thomas Falone, Mickleton, NJ (US)

(73) Assignee: Matscitechno Licensing Company, Kennett Square, PA (US)

( * ) Notice: Subject to any disclaimer, the term of this patent is extended or adjusted under 35 U.S.C. 154(b) by 944 days.

This patent is subject to a terminal disclaimer.

(21) Appl. No.: 11/873,825

(22) Filed: Oct. 17, 2007

(65) Prior Publication Data

US 2009/0065299 A1    Mar. 12, 2009

Related U.S. Application Data

(63) Continuation-in-part of application No. 11/019,568, filed on Dec. 22, 2004, now Pat. No. 7,171,697, and a continuation-in-part of application No. 11/635,939, filed on Dec. 8, 2006, and a continuation-in-part of application No. 10/999,246, filed on Nov. 30, 2004, and a continuation-in-part of application No. 10/958,611, filed on Oct. 5, 2004, now Pat. No. 7,150,113, which is a continuation-in-part of application No. 10/856,215, filed on May 27, 2004, now Pat. No. 6,942,586.

(51) Int. Cl.
   *A41D 13/08*    (2006.01)
(52) U.S. Cl.
   USPC ............................................................. 2/16
(58) Field of Classification Search .................. 2/16, 20, 2/161.1, 161.6
See application file for complete search history.

(56) References Cited

U.S. PATENT DOCUMENTS

| | | |
|---|---|---|
| 559,940 A | 7/1866 | Bocking |
| 1,125,029 A | 1/1915 | Lard |
| 1,195,994 A | 8/1916 | Lard |
| 1,498,838 A | 6/1924 | Harrison, Jr. |
| 1,551,203 A | 8/1925 | Mills |
| 1,620,118 A | 3/1927 | Mattern |
| 1,701,856 A | 2/1929 | Kraeuter |
| 1,772,414 A | 8/1930 | Brooke-Hunt et al. |
| 2,023,131 A | 12/1935 | Gibson |
| 2,099,521 A | 11/1937 | Herkimer et al. |
| 2,871,899 A | 2/1959 | Coyle et al. |
| 3,129,003 A * | 4/1964 | Mueller et al. ............... 473/568 |
| 3,353,981 A | 11/1967 | Jacob |

(Continued)

FOREIGN PATENT DOCUMENTS

| | | |
|---|---|---|
| DE | 2805314 | 8/1979 |
| DE | 87 15 697 | 2/1988 |

(Continued)

OTHER PUBLICATIONS

DATABASE WIP Week 198711, Derwent Publications Ltd., London, GB; AN 1987-075332, Feb. 5, 1987 (Abstract).

(Continued)

*Primary Examiner* — Katherine Moran
(74) *Attorney, Agent, or Firm* — RatnerPrestia

(57) ABSTRACT

A composite formed by a reinforced elastomer material that dissipates, isolates, and absorbs sound and vibrational energy waves.

6 Claims, 20 Drawing Sheets

U.S. PATENT DOCUMENTS

| | | | |
|---|---|---|---|
| 3,398,233 A | 8/1968 | De Lizasoain et al. | |
| 3,515,625 A | 6/1970 | Sedlak et al. | |
| 3,606,326 A | 9/1971 | Sparks et al. | |
| 3,716,433 A | 2/1973 | Plummer | |
| 3,730,509 A | 5/1973 | Jorn | |
| 3,779,551 A | 12/1973 | Wilson | |
| 3,791,050 A | 2/1974 | Egtvedt | |
| 3,862,882 A | 1/1975 | Marzocchi | |
| 4,015,851 A | 4/1977 | Pennell | |
| 4,035,847 A | 7/1977 | Prince et al. | |
| 4,044,625 A | 8/1977 | D'Haem et al. | |
| 4,134,198 A | 1/1979 | Briggs | |
| 4,143,109 A | 3/1979 | Stockum | |
| 4,147,443 A | 4/1979 | Skobel | |
| 4,197,611 A | 4/1980 | Bell et al. | |
| 4,237,177 A | 12/1980 | Slama et al. | |
| 4,261,567 A | 4/1981 | Uffindell | |
| 4,268,574 A | 5/1981 | Peccenini et al. | |
| 4,338,270 A | 7/1982 | Uffindell | |
| 4,347,280 A * | 8/1982 | Lau et al. | 428/304.4 |
| 4,417,042 A | 11/1983 | Dziark | |
| 4,483,972 A | 11/1984 | Mitchell | |
| 4,504,991 A | 3/1985 | Klancnik | |
| 4,526,828 A * | 7/1985 | Fogt et al. | 442/19 |
| 4,552,713 A | 11/1985 | Cavicchioli | |
| 4,575,446 A | 3/1986 | Schaefer | |
| 4,584,232 A | 4/1986 | Frank et al. | |
| 4,591,160 A | 5/1986 | Piragino | |
| 4,597,578 A | 7/1986 | Lancaster | |
| 4,613,537 A | 9/1986 | Krüpper | |
| 4,660,832 A | 4/1987 | Shomo | |
| 4,706,788 A | 11/1987 | Inman et al. | |
| 4,736,949 A | 4/1988 | Muroi | |
| 4,819,939 A | 4/1989 | Kobayashi | |
| 4,864,738 A | 9/1989 | Horovitz | |
| 4,912,836 A | 4/1990 | Avetoom | |
| 4,919,420 A | 4/1990 | Sato | |
| 4,948,131 A | 8/1990 | Nakanishi | |
| 4,953,862 A | 9/1990 | Uke et al. | |
| 4,983,242 A | 1/1991 | Reed | |
| 4,989,643 A | 2/1991 | Walton et al. | |
| 5,005,254 A | 4/1991 | Uffindell | |
| 5,042,804 A | 8/1991 | Uke et al. | |
| 5,083,361 A * | 1/1992 | Rudy | 29/454 |
| 5,083,780 A | 1/1992 | Walton et al. | |
| 5,088,734 A | 2/1992 | Glava | |
| 5,110,653 A | 5/1992 | Landi | |
| 5,122,405 A * | 6/1992 | Landi | 428/116 |
| 5,137,769 A | 8/1992 | Landi | |
| 5,193,246 A | 3/1993 | Huang | |
| 5,199,706 A | 4/1993 | Chen | |
| 5,203,561 A | 4/1993 | Lanctot | |
| 5,240,247 A | 8/1993 | Didier | |
| 5,254,391 A | 10/1993 | Davis | |
| 5,258,088 A | 11/1993 | Wu | |
| 5,261,665 A | 11/1993 | Downey | |
| 5,267,487 A | 12/1993 | Falco et al. | |
| 5,269,516 A | 12/1993 | Janes | |
| 5,282,618 A | 2/1994 | Hong | |
| 5,290,036 A | 3/1994 | Fenton et al. | |
| 5,294,119 A | 3/1994 | Vincent et al. | |
| 5,308,675 A | 5/1994 | Crane et al. | |
| 5,319,867 A | 6/1994 | Weber | |
| 5,322,280 A | 6/1994 | Wu | |
| 5,322,285 A | 6/1994 | Turner | |
| 5,322,290 A | 6/1994 | Minami | |
| 5,333,861 A | 8/1994 | Mills | |
| 5,337,420 A | 8/1994 | Haysom et al. | |
| 5,338,600 A | 8/1994 | Fitchmun et al. | |
| 5,339,793 A | 8/1994 | Findley | |
| 5,348,303 A | 9/1994 | Swissheim | |
| 5,355,552 A | 10/1994 | Huang | |
| 5,360,653 A | 11/1994 | Ackley | |
| 5,362,046 A | 11/1994 | Sims | |
| 5,377,979 A | 1/1995 | Long | |
| 5,384,083 A | 1/1995 | Dawn et al. | |
| 5,395,108 A | 3/1995 | Souders et al. | |
| 5,435,549 A | 7/1995 | Chen | |
| 5,463,824 A | 11/1995 | Barna | |
| 5,511,777 A | 4/1996 | McNeely | |
| 5,516,101 A | 5/1996 | Peng | |
| 5,524,885 A | 6/1996 | Heo | |
| 5,528,842 A | 6/1996 | Ricci et al. | |
| 5,543,194 A * | 8/1996 | Rudy | 428/69 |
| 5,547,189 A | 8/1996 | Billings | |
| 5,575,473 A | 11/1996 | Turner | |
| 5,593,158 A | 1/1997 | Filice et al. | |
| 5,621,914 A | 4/1997 | Ramone et al. | |
| 5,624,114 A | 4/1997 | Kelsey | |
| D379,208 S | 5/1997 | Kulisek, Jr. | |
| 5,636,377 A | 6/1997 | Wiener | |
| 5,653,643 A * | 8/1997 | Falone et al. | 473/300 |
| 5,655,975 A | 8/1997 | Nashif | |
| 5,657,985 A | 8/1997 | Dahlström | |
| 5,673,437 A | 10/1997 | Chse et al. | |
| 5,686,158 A | 11/1997 | Gibbon | |
| 5,695,408 A | 12/1997 | DeLaCruz et al. | |
| 5,718,064 A | 2/1998 | Pyle | |
| 5,729,830 A | 3/1998 | Luhtala | |
| 5,730,662 A | 3/1998 | Rens | |
| 5,745,923 A | 5/1998 | Katz | |
| 5,749,798 A | 5/1998 | Kuebler et al. | |
| 5,759,113 A | 6/1998 | Lai et al. | |
| 5,772,524 A | 6/1998 | Huang | |
| 5,789,327 A | 8/1998 | Rousseau | |
| 5,840,397 A | 11/1998 | Laundi et al. | |
| 5,842,933 A | 12/1998 | Lewis | |
| 5,843,851 A | 12/1998 | Cochran | |
| 5,858,521 A | 1/1999 | Okuda et al. | |
| 5,912,195 A | 6/1999 | Walla et al. | |
| 5,916,664 A | 6/1999 | Rudy | |
| 5,926,847 A | 7/1999 | Eibert | |
| 5,944,617 A | 8/1999 | Falone et al. | |
| 5,946,734 A | 9/1999 | Vogan | |
| 5,963,989 A | 10/1999 | Robertson | |
| 5,979,081 A | 11/1999 | Vaz | |
| 6,000,062 A | 12/1999 | Trakh | |
| 6,007,439 A | 12/1999 | MacKay, Jr. | |
| 6,030,355 A | 2/2000 | Callinan et al. | |
| 6,074,965 A | 6/2000 | Bodenschatz et al. | |
| 6,077,793 A | 6/2000 | Hatjasalo et al. | |
| 6,167,639 B1 | 1/2001 | Ventura | |
| 6,216,276 B1 | 4/2001 | Eibert | |
| 6,219,940 B1 | 4/2001 | Kita | |
| 6,231,946 B1 | 5/2001 | Brown, Jr. et al. | |
| 6,318,002 B1 | 11/2001 | Ou | |
| 6,368,989 B1 | 4/2002 | Pascual et al. | |
| 6,416,432 B1 | 7/2002 | Rosen et al. | |
| 6,505,421 B1 | 1/2003 | Vaz | |
| 6,558,270 B2 | 5/2003 | Kwitek | |
| 6,578,836 B2 | 6/2003 | Kogure et al. | |
| 6,652,366 B2 * | 11/2003 | Dyer | 451/60 |
| 6,880,269 B2 | 4/2005 | Falone et al. | |
| 6,928,658 B2 | 8/2005 | Taira et al. | |
| 6,944,974 B2 | 9/2005 | Falone et al. | |
| 6,969,548 B1 | 11/2005 | Goldfine | |
| 7,150,113 B2 * | 12/2006 | Vito et al. | 36/44 |
| 7,171,697 B2 * | 2/2007 | Vito et al. | 2/161.1 |
| 2003/0070209 A1 | 4/2003 | Falone et al. | |
| 2005/0037189 A1 | 2/2005 | Palmer et al. | |
| 2005/0132614 A1 | 6/2005 | Brennan | |
| 2005/0266748 A1 | 12/2005 | Wagner et al. | |
| 2006/0000009 A1 | 1/2006 | Fleming | |
| 2006/0157901 A1 | 7/2006 | Vito et al. | |

FOREIGN PATENT DOCUMENTS

| | | |
|---|---|---|
| DE | 93 12 305 U1 | 10/1993 |
| EP | 0374597 A | 6/1990 |
| GB | 350142 | 6/1931 |
| GB | 458367 | 12/1936 |
| KR | 10-2000-0022092 | 4/2000 |
| WO | 9100966 A | 1/1991 |
| WO | WO 01/24651 A1 | 4/2001 |
| WO | 03018144 A | 3/2003 |
| WO | 03032762 A | 4/2003 |
| WO | 03066174 A | 8/2003 |

OTHER PUBLICATIONS

USPTO Office Action issued for U.S. Appl. No. 12/324,281 mailed Jun. 19, 2012.

Notice of Second Office Action for PRC Patent Application No. 200580039447.9 issued on Nov. 9, 2011 (with English Translation).

Korean Office Action for Korean Application No. 10-2011-7005051 mailed Feb. 29, 2012.

USPTO Office Action issued for U.S. Appl. No. 12/570,499 mailed May 30, 2012.

Supplemental European Search Report for EPO 05809057.2 mailed May 11, 2012.

Taiwanese Notification of First Office Action for Taiwanese Patent Application 094134880 mailed May 21, 2012.

International Search Report for PCT Application No. PCT/US2012/032669 mailed Sep. 24, 2012.

International Search Report and Written Opinion for PCT Application No. PCT/US2012/040104 mailed Sep. 25, 2012.

USPTO Final Office Action issued for U.S. Appl. No. 12/570,499 mailed Oct. 17, 2012.

* cited by examiner

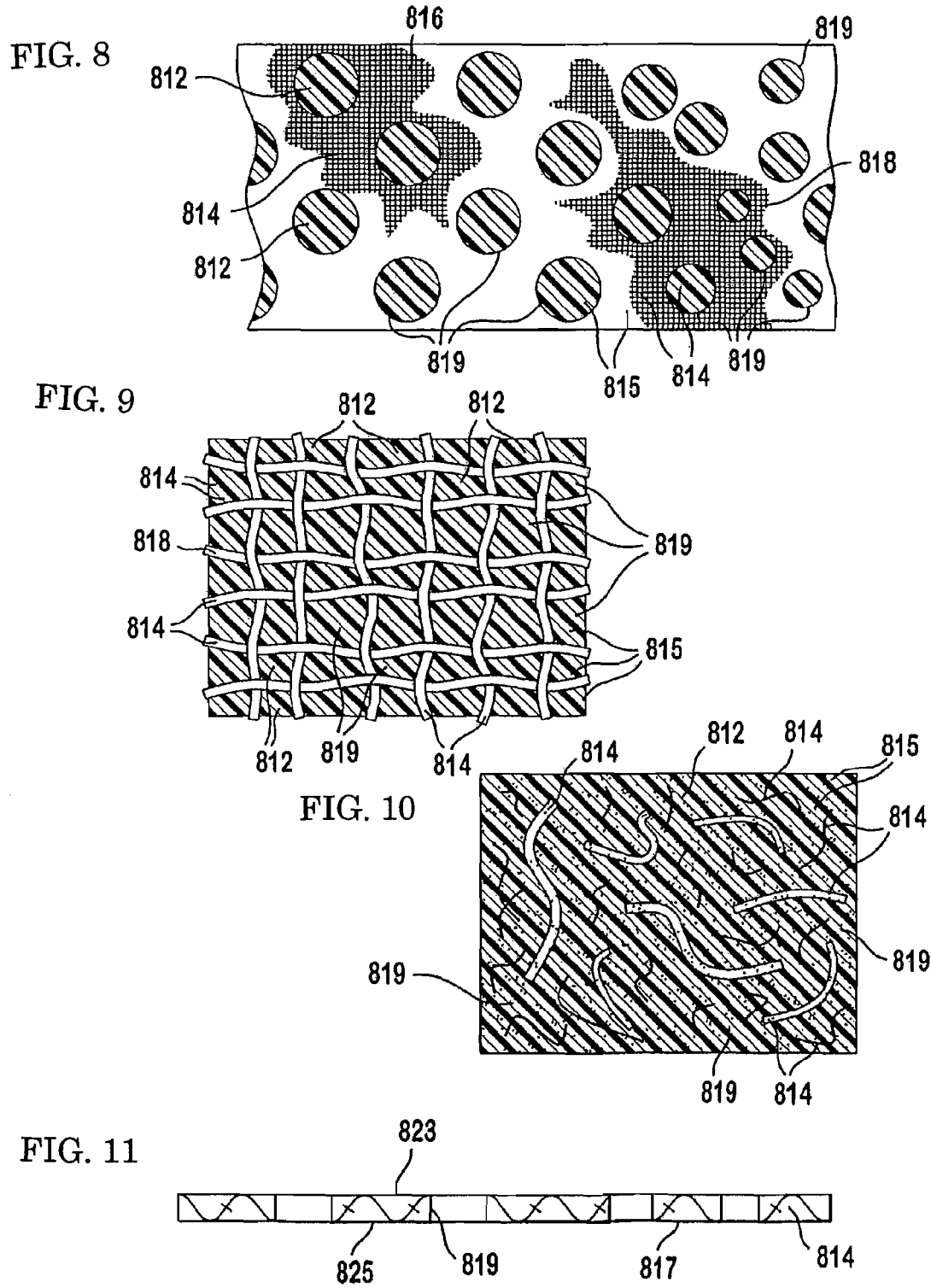

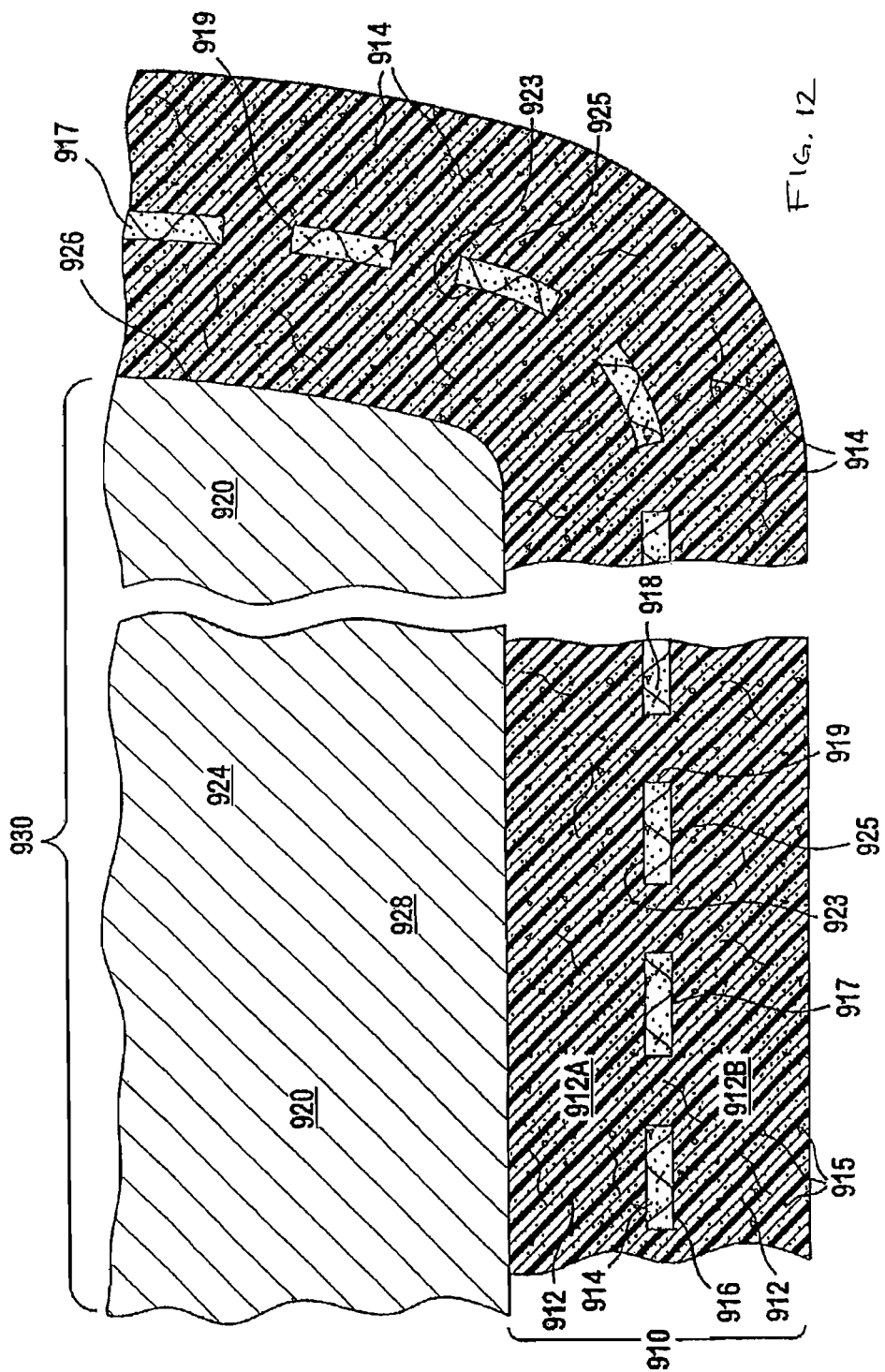

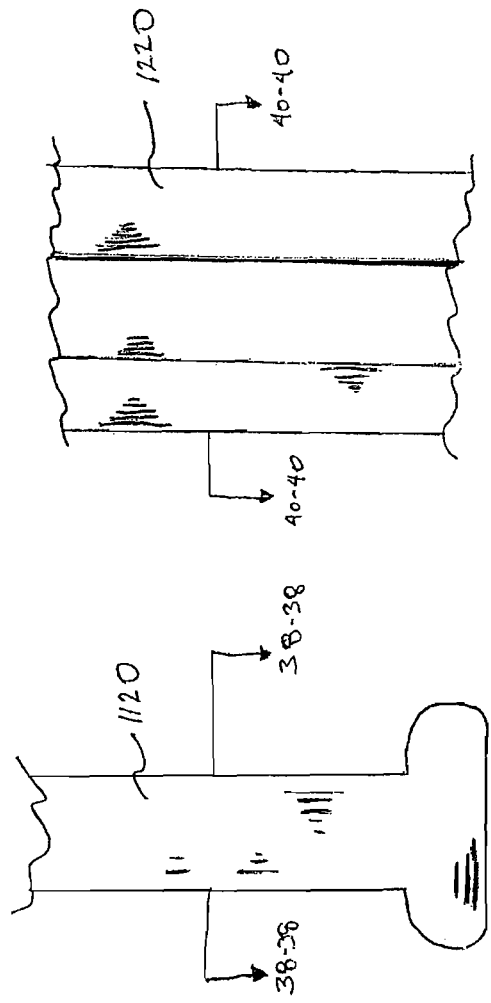
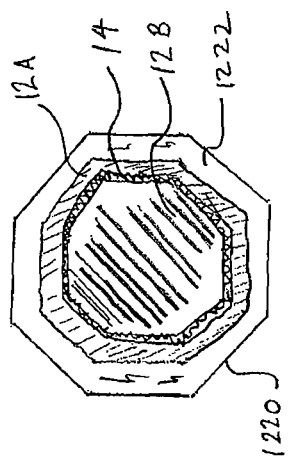
FIG. 39
FIG. 40
FIG. 37
FIG. 38

SOUND DISSIPATING MATERIAL

CROSS REFERENCE TO RELATED APPLICATIONS

This application is a continuation-in-part of U.S. patent application Ser. No. 11/019,568, filed Dec. 22, 2004, now U.S. Pat. No. 7,171,697, which claims the benefit of priority to U.S. patent application Ser. No. 10/999,246, filed Nov. 30, 2004, now abandoned which is a continuation in part of and claims priority to U.S. patent application Ser. No. 10/958,611, filed Oct. 5, 2004, now U.S. Pat. No. 7,150,113 which is a continuation in part of and claims priority to U.S. patent application Ser. No. 10/856,215, filed May 27, 2004, now U.S. Pat. No. 6,942,586 which is a continuation of and claims priority to U.S. patent application Ser. No. 10/659,560, filed Sep. 10, 2003, now U.S. Pat. No. 6,935,973 which is a divisional of and claims priority to U.S. patent application Ser. No. 09/939,319, filed on Aug. 27, 2001, now U.S. Pat. No. 6,652,398; this application also claims priority to each of U.S. patent applications Ser. No. 10/958,941, now abandoned; U.S. Ser. No. 10/958,767, now abandoned; Ser. No. 10/958,952, now abandoned; Ser. No. 10/958,745, now pending; and Ser. No. 11/635,939, now abandoned.

FIELD OF INVENTION

The field of the invention is sound-reducing materials.

BACKGROUND

The present invention is directed to a composite material adapted to dissipate and absorb vibrational energy waves while maintaining favorable stiffness and weight characteristics.

Noise control solutions are becoming increasing critical in a vast array of fields including commercial and industrial equipment, consumer electronics, transportation, as well as countless other specialty areas. These applications require an efficient and economical sound insulating material with the ability to be adapted to fill a wide variety of damping requirements.

Viscoelastic materials are typically used in sound damping applications to provide hysteretic energy dissipation, meaning damping provided by the yielding or straining of the molecules of the material. These materials offer somewhat limited damping efficiency as a result of providing very few avenues for energy dissipation and absorption. Viscoelastic materials that do possess acceptable levels of energy dissipation do so at the expense of increased material thickness and further, fail to provide the structural stiffness required in many of today's applications. In contrast, conventional composite materials have high stiffness-to-weight ratios however they generally exhibit very poor damping characteristics.

Clearly what is needed is a material capable of providing substantially increased damping efficiency while maintaining minimal material thickness and favorable stiffness and weight characteristics.

SUMMARY

The present invention provides such a material that can be both stiff and lightweight and describes in one embodiment, a composite sound dissipating and isolating material including first and second elastomer layers. A reinforcement layer is disposed between and generally separates the first and second elastomer layers.

BRIEF DESCRIPTION OF THE DRAWING(S)

The foregoing summary, as well as the following detailed description of the preferred embodiments of the present invention will be better understood when read in conjunction with the appended drawings. For the purpose of illustrating the invention, there are shown in the drawings embodiments which are presently preferred. It is understood, however, that the invention is not limited to the precise arrangements and instrumentality shown.

In the drawings:

FIG. 8 is a cross-sectional view of an embodiment of the support structure as taken along the lines 8-8 of FIG. 5, the support structure is formed of polymer and/or elastomer and/or fibers, either of which may contain fibers, passageways extend through the support structure allowing the vibration dissipating material to penetrate the support structure;

FIG. 9 is cross-sectional view of an alternate embodiment of the support structure as viewed in a manner similar to that of FIG. 5 illustrating a support structure formed by woven fibers, passageways through the woven fibers allow the support structure to be penetrated by the vibration dissipating material;

FIG. 10 is cross-sectional view of another alternate support structure as viewed in a manner similar to that of FIG. 5, the support structure formed by plurality of fibers, passageways past the fibers allow the vibration dissipating material to penetrate the support structure;

FIG. 11 is a side elevational view of the support structure of FIG. 5;

FIG. 12 is a cross-sectional view of another embodiment of the material of the present invention illustrating a single layer vibration dissipating material with a support structure embedded therein, the material extends along a longitudinal portion of an implement and covers a proximal end thereof;

Figure 12A:
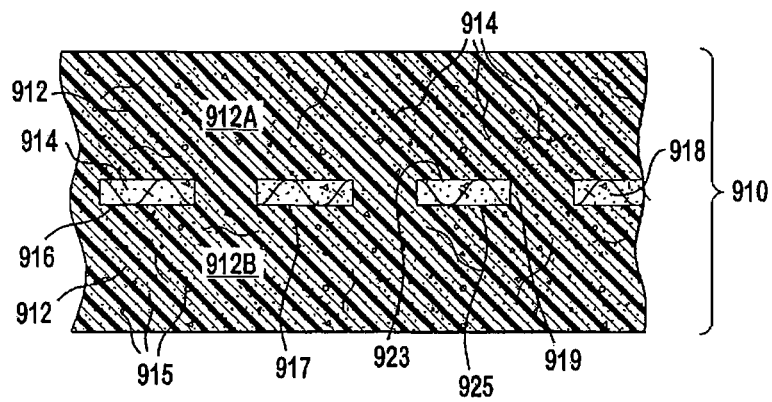
FIG. 12A is a cross-sectional view of the material of FIG. 12.
Figure 13:
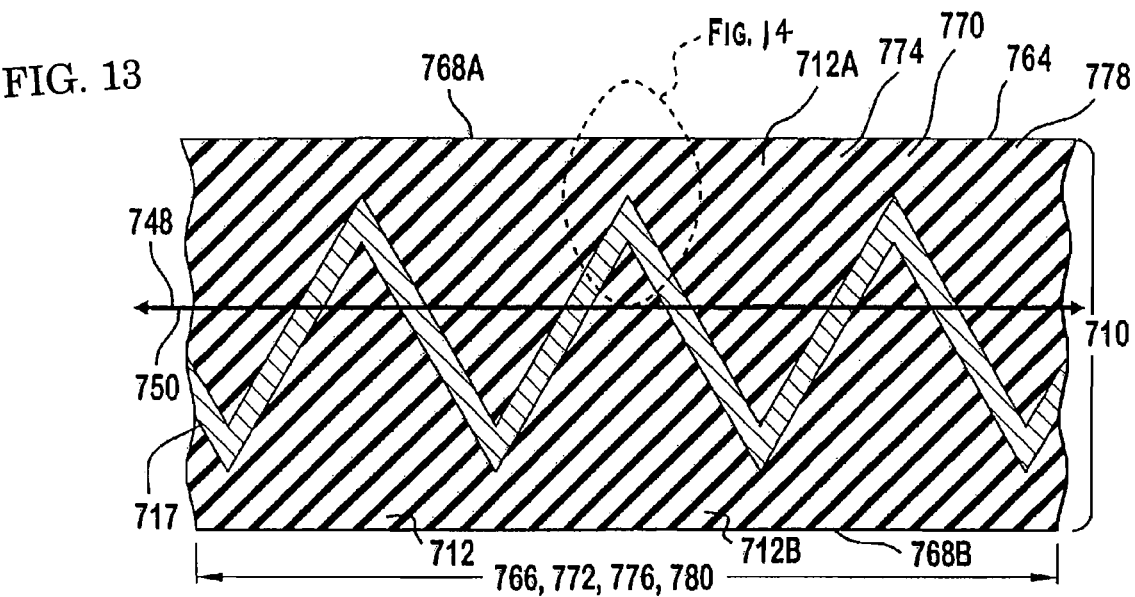
Figure 14:
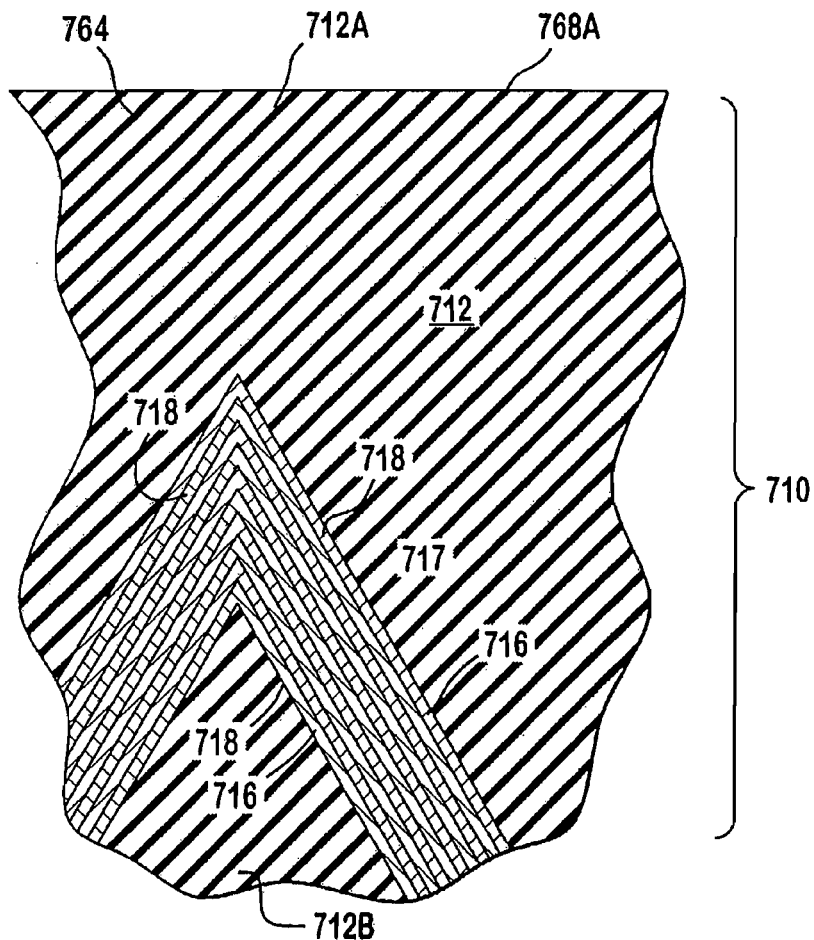
Figure 15:
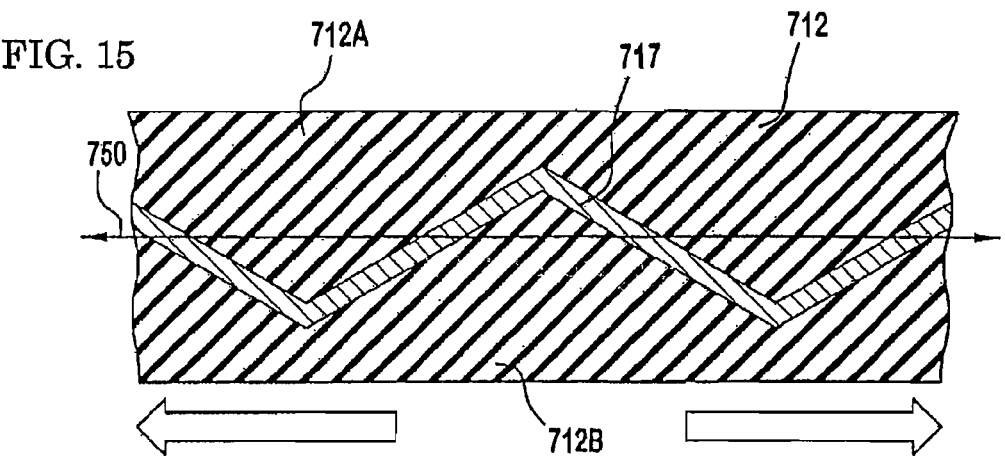
Figure 16:
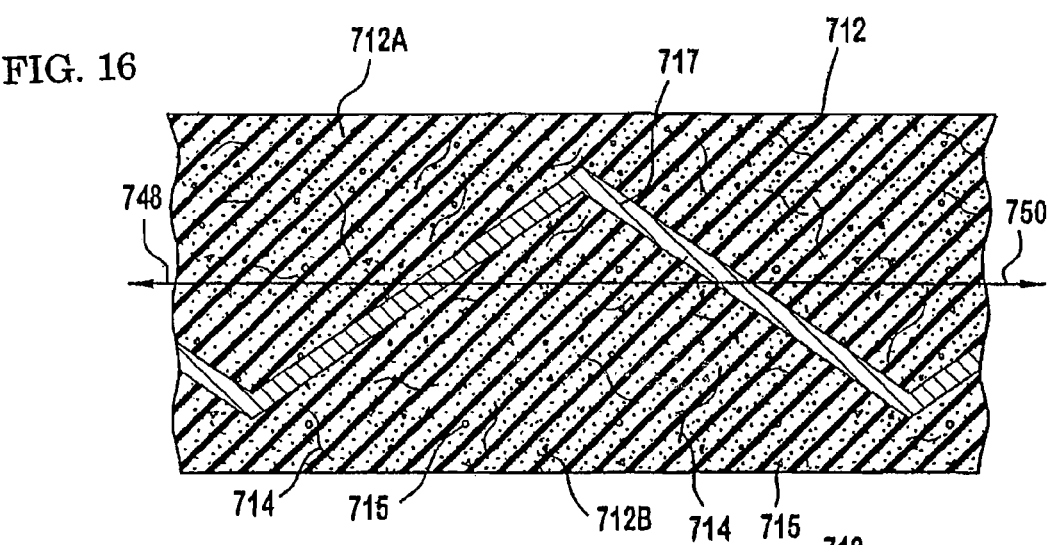
Figure 17:
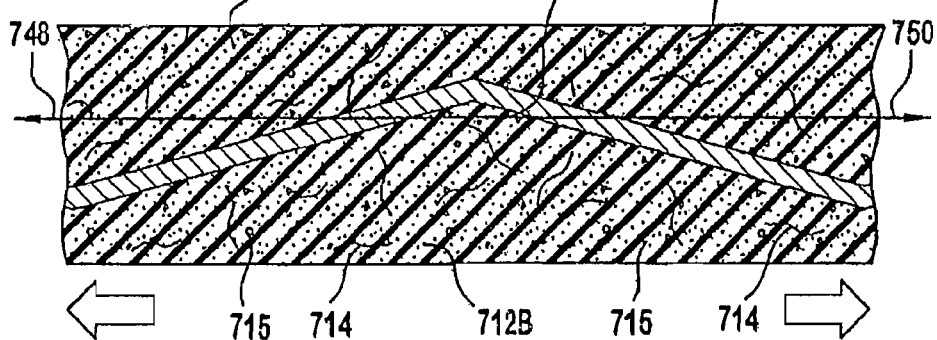
Figure 18:
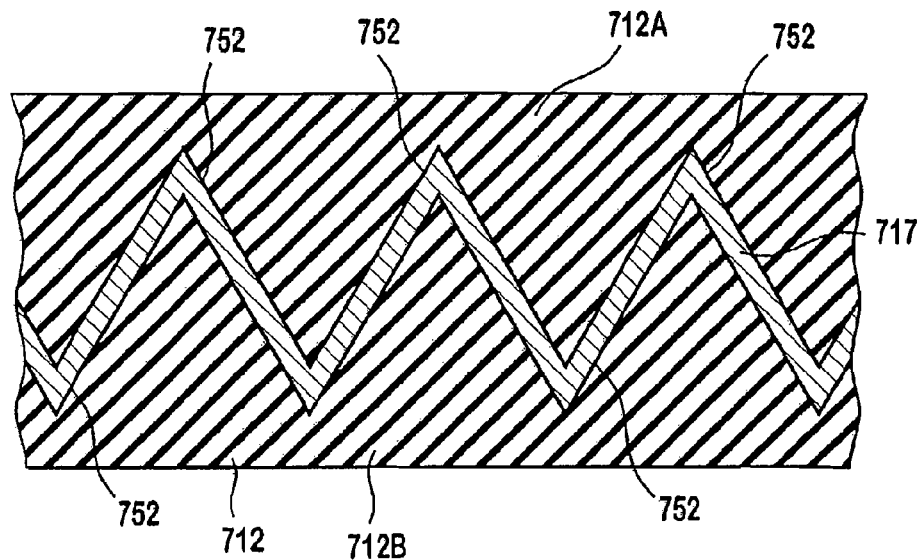
Figure 19:
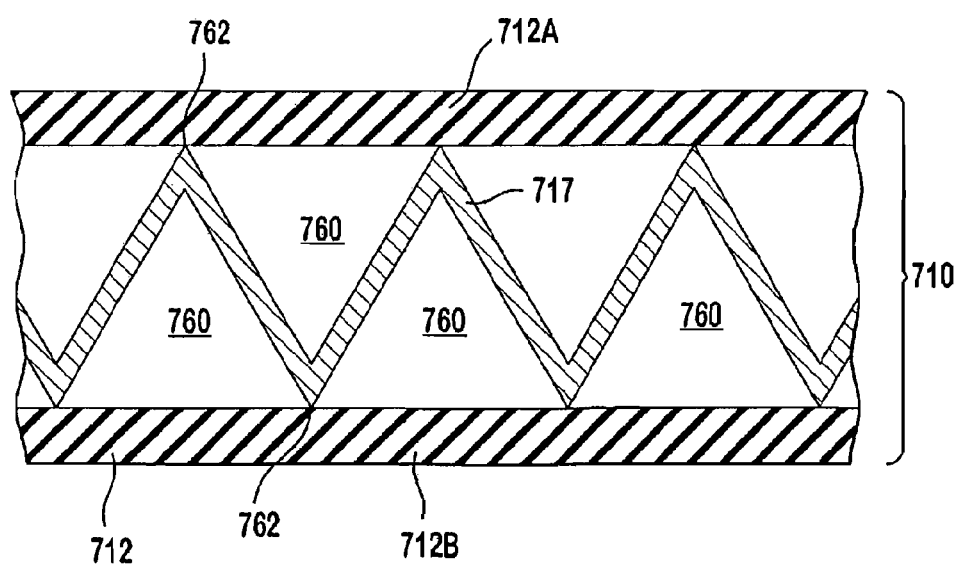
Figure 20:
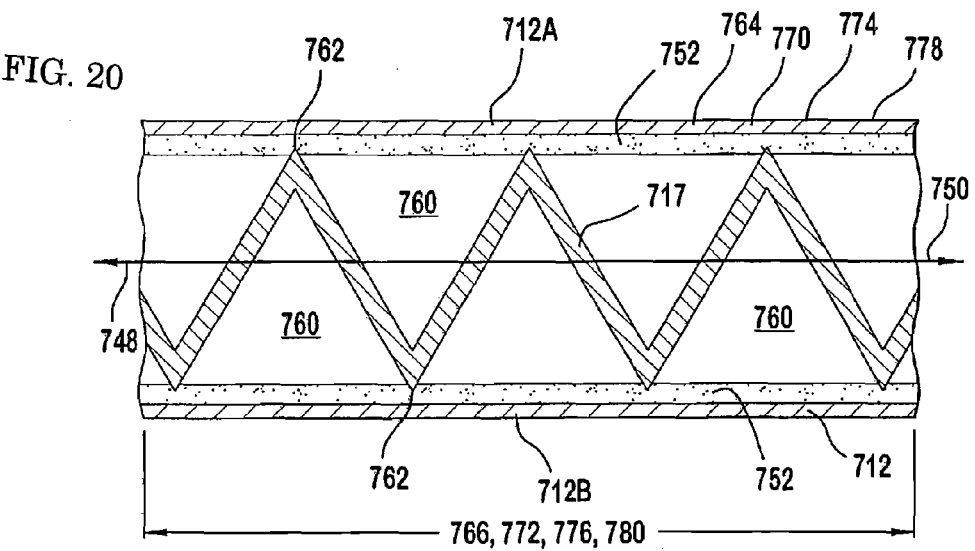
Figure 21:
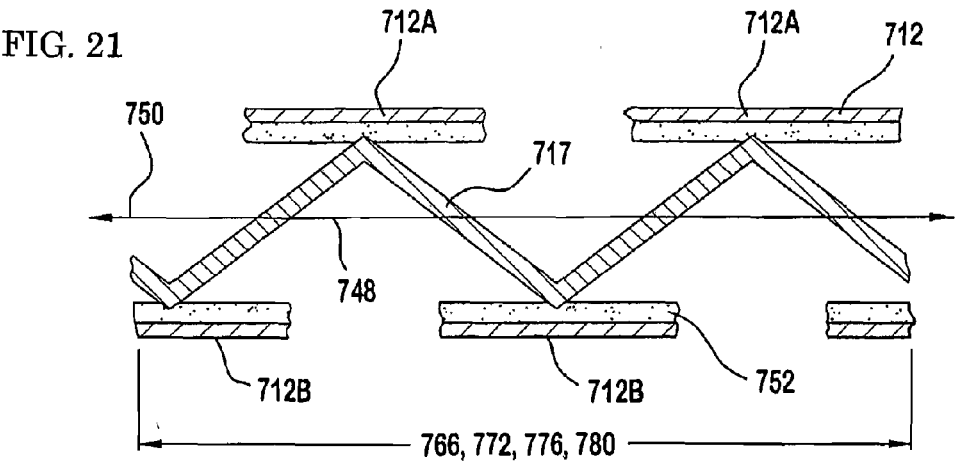
Figure 22:
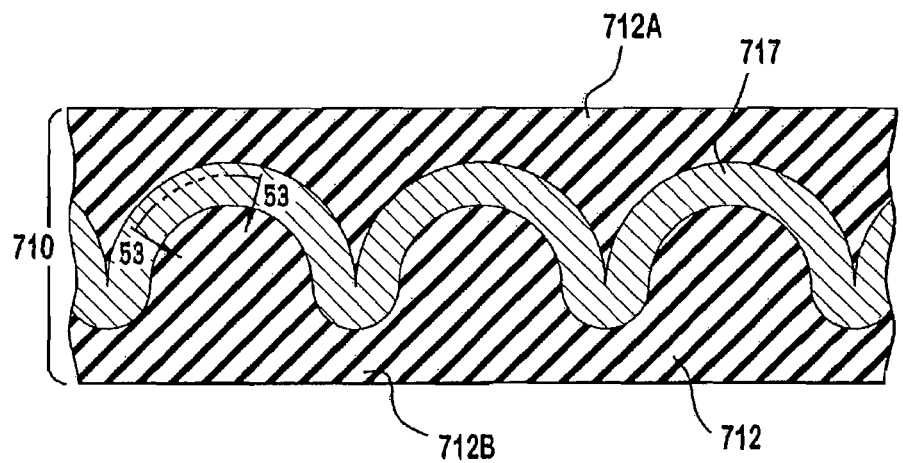
Figure 23:
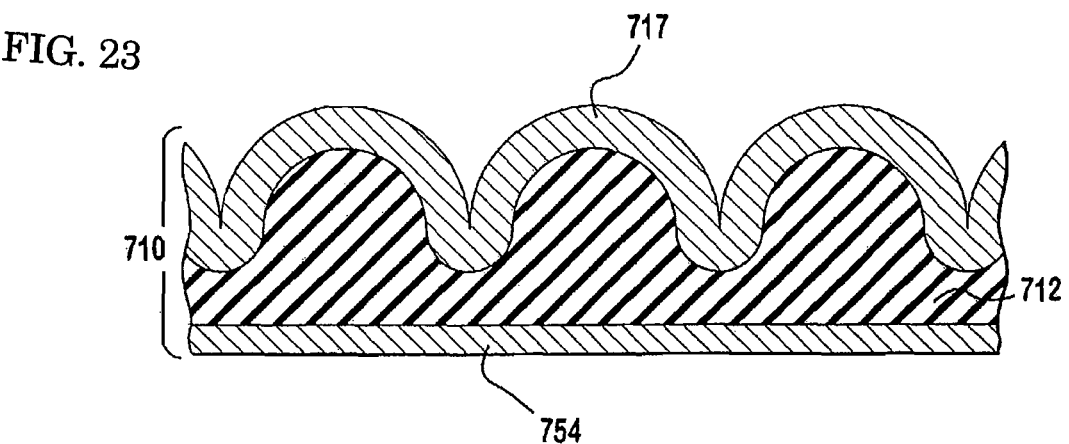
Figure 24:
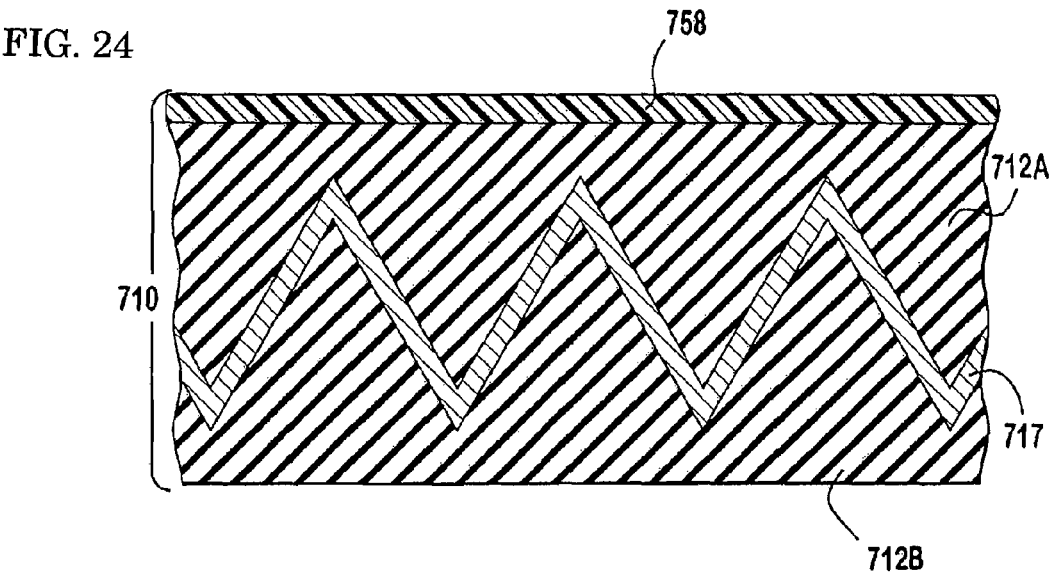
Figure 25:
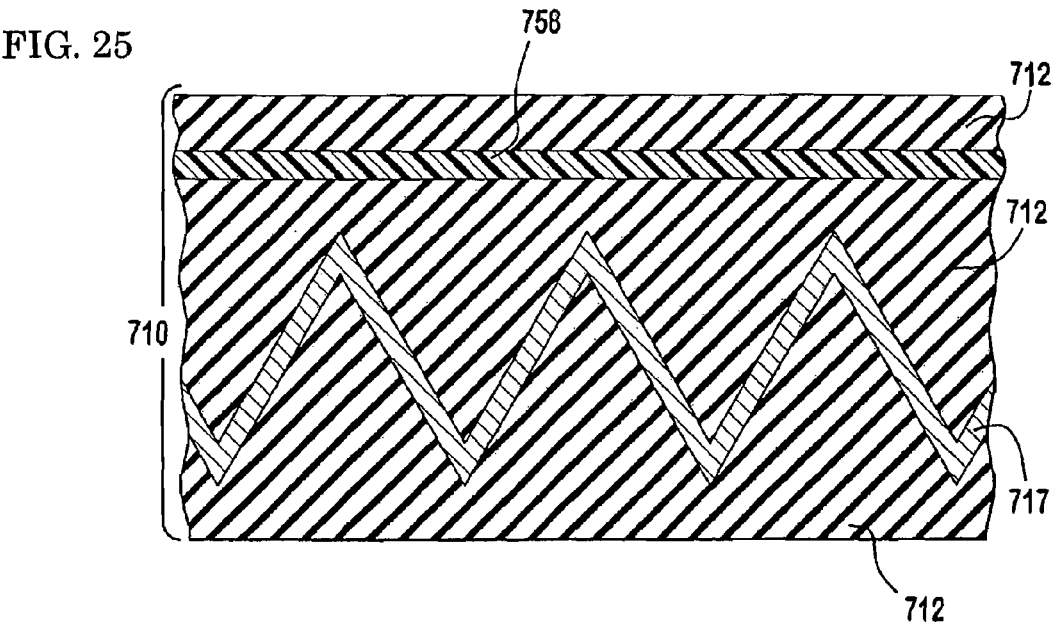
Figure 26:
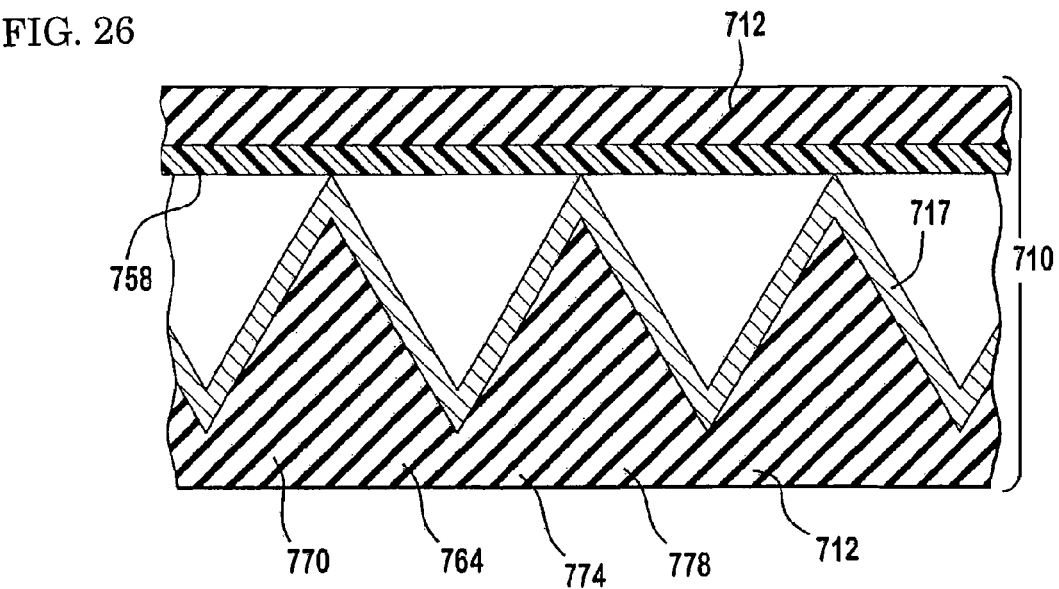
Figure 27:
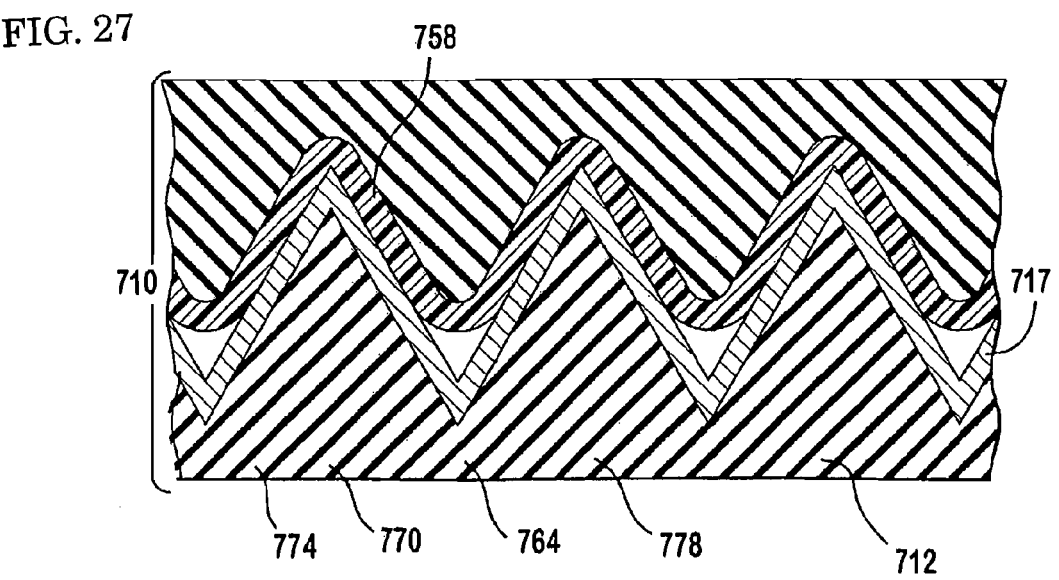
Figure 28:
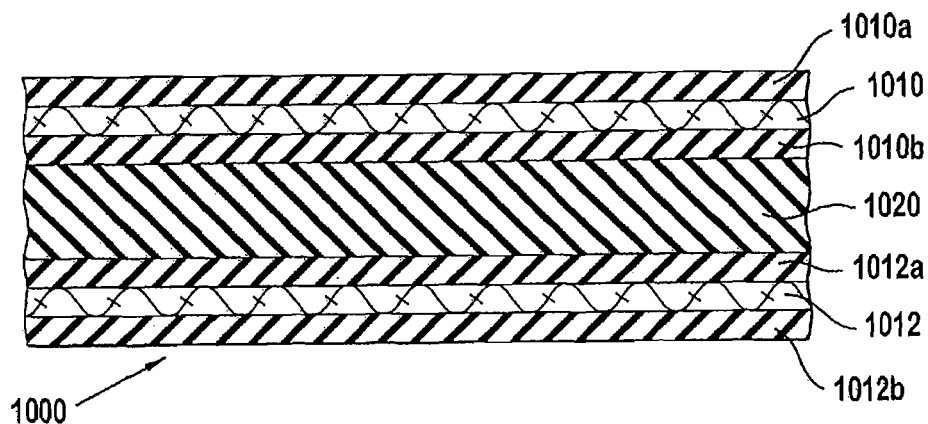
Figure 29:
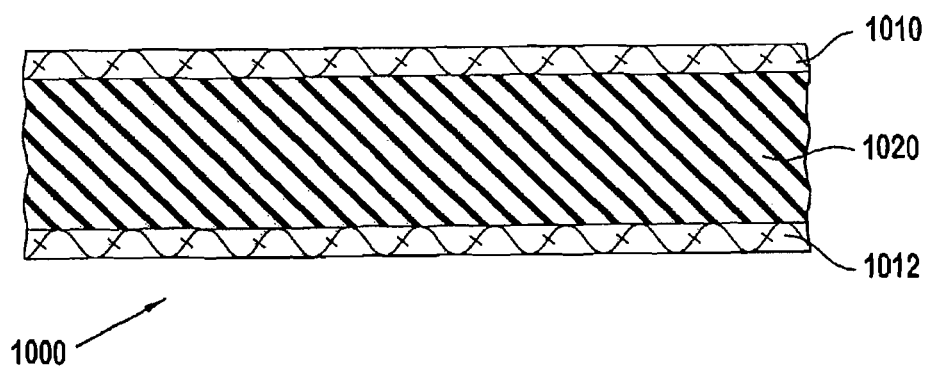
Figure 30:
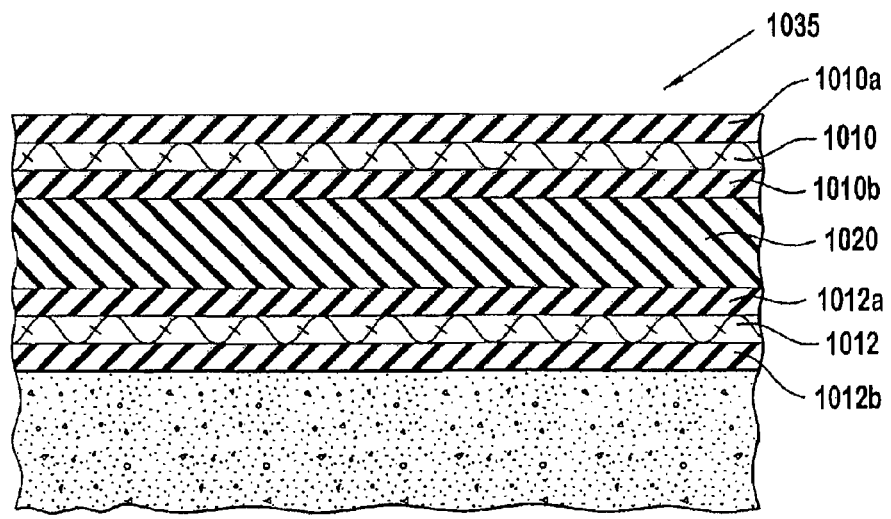
Figure 31:
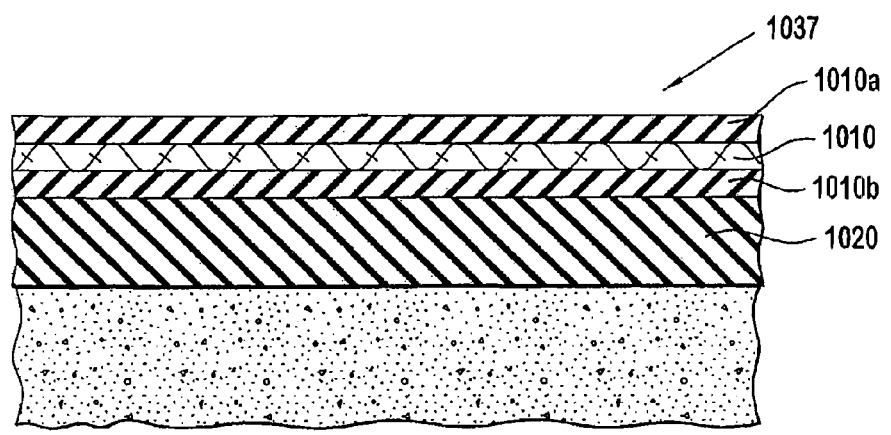
Figure 32:
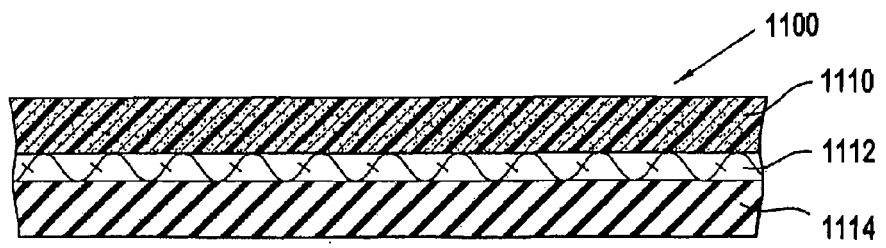
Figure 33:
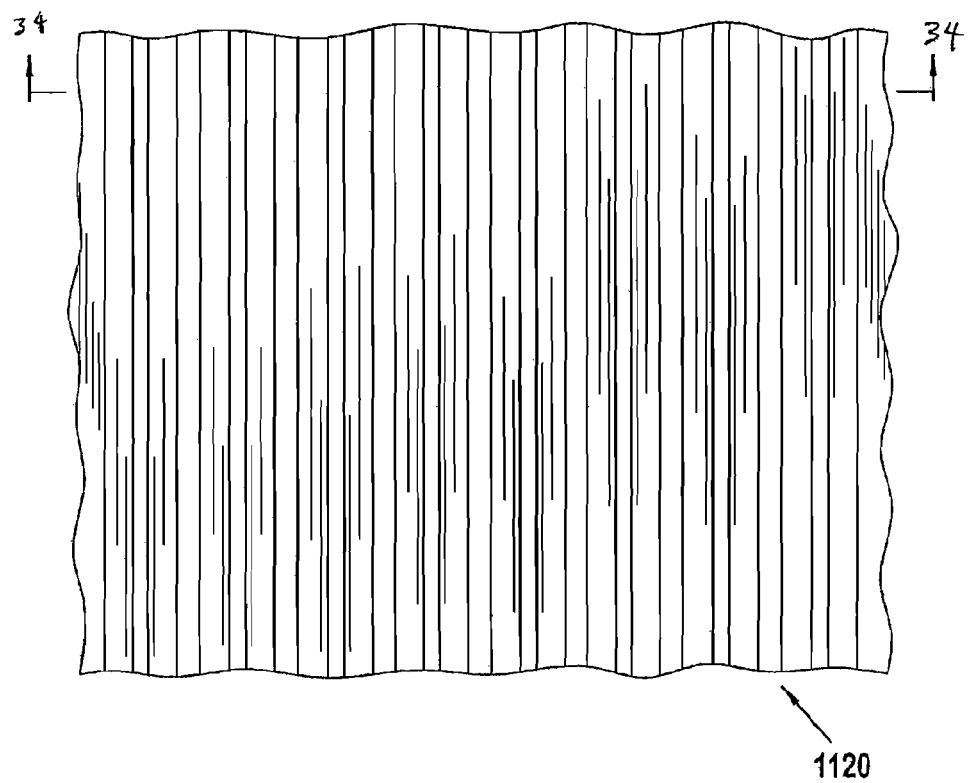
Figure 34:
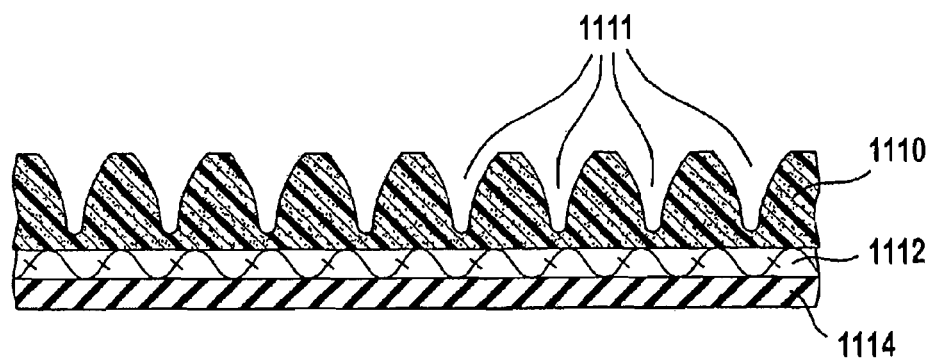
Figure 35:
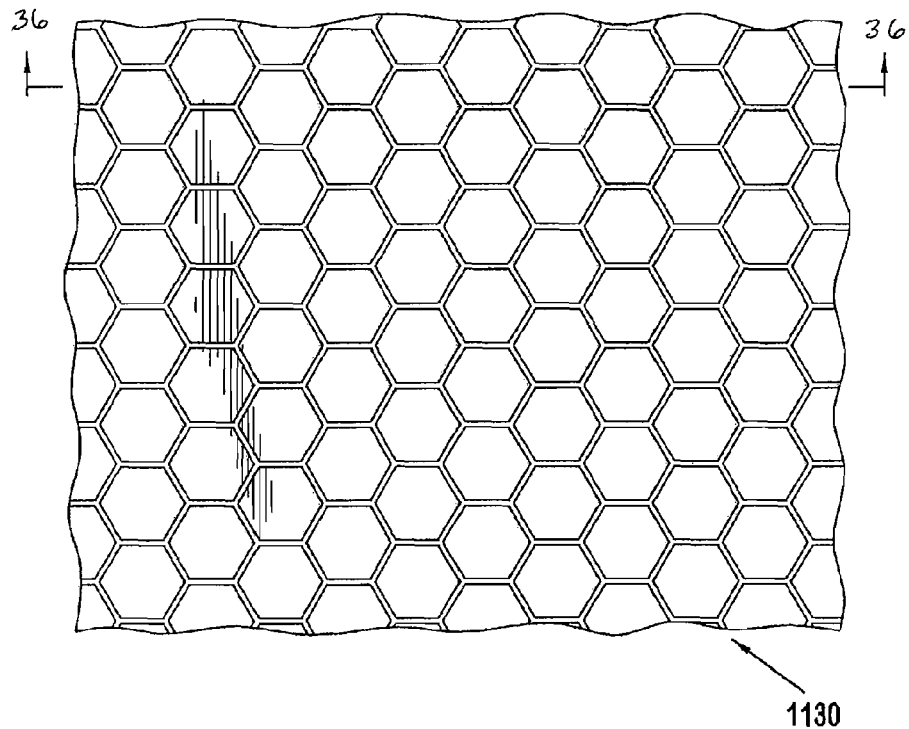
Figure 36:
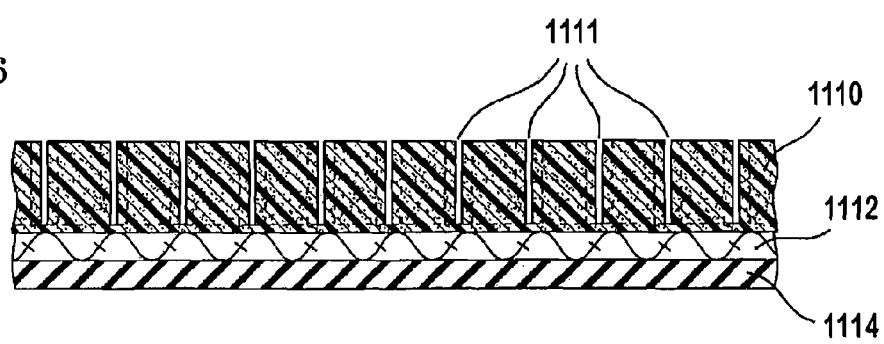

FIG. 13 is a cross-sectional view of yet another embodiment of the material of the present invention illustrating a single layer of vibration dissipating material with a support structure embedded therein; the support structure is disposed within the vibration dissipating material generally along a longitudinal axis in an at least partially non linear fashion so that a length of the support structure, as measured along a surface thereof, is greater than the length of the vibration dissipating material as measured along the longitudinal axis, of the material body;

FIG. 14 is an enlarged broken away view of the area enclosed by the dashed lines labeled "FIG. 13" in FIG. 13 and illustrates that the "overall support structure" can actually be formed by a plurality of individual stacked support structures (which can be the same or different from each other) or a successive plurality of stacked fibers and/or a successive plurality of stacked cloth layers;

FIG. 15 is a cross-sectional view of the material of FIG. 13 stretched along the longitudinal axis into a second position, in which the material body is elongated by a predetermined amount relative to the first position; the straightening of the support structure causes energy to be dissipated and preferably generally prevents further elongation of the material along the longitudinal axis past the second position;

FIG. 16 is a cross-sectional view of another embodiment of the material of the present invention illustrating a more linear support structure within the material while the material is in the first position; the more linear arrangement of the support structure in the material, relative to that shown in FIG. 13, reduces the amount of elongation that is possible before the material stops stretching and effectively forms a brake on further movement;

FIG. 17 is a cross-sectional view of the material of FIG. 16 stretched along the longitudinal axis into the second position, in which the material is elongated along the longitudinal axis by a predetermined amount; because the support structure was more linear while the material was in the first position, relative to the material shown in FIG. 16, it is preferred that the amount of elongation of the material when the material is in the second position is reduced relative to the material shown in FIGS. 13 and 16;

FIG. 18 is a cross-sectional view of another embodiment of the material of the present invention illustrating the support structure with an adhesive layer generally over its major surfaces to allow the elastomer material to be secured thereto rather than molded and/or extruded thereover;

FIG. 19 is a cross-sectional view of another embodiment of the material of the present invention illustrating the support structure, or ribbon material, positioned between two spaced elastomer layers with the support structure's peaks molded, fastened, and/or otherwise affixed to the elastomer layer at a plurality of locations; air gaps are preferably present about the support structure to facilitate longitudinal stretching of the material; alternatively, the support structure can be secured only at its lateral ends (i.e., the left and right ends of the support structure viewed in FIG. 19) to the elastomer layers so that the remainder of the support structure moves freely within an outer sheath of elastomer material and functions as a spring/elastic member to limit the elongation of the material;

FIG. 20 is another embodiment of the vibration dissipating material of the present invention and is similar to the material shown in FIG. 19, except that the support structure's peaks are secured to the elastomer layers via an adhesive layer;

FIG. 21 is another embodiment of the vibration dissipating material of the present invention and illustrates the vibration dissipating material and any accompanying adhesive actually physically breaking when the support structure is elongated into the second position; the breaking of the vibration dissipating material results in further energy dissipation and vibration absorption in addition to that dissipated by the support structure;

FIG. 22 is another embodiment of the vibration dissipating material of the present invention and illustrates that the support structure, or ribbon material, can be disposed in any geometry within the vibration dissipating material; additionally, individually rigid squares, buttons, or plates (not shown) can be positioned on one side of the material to further spread impact force along the surface of the material prior to the dissipation of vibration by the material in general; additionally, such buttons, plates, or other rigid surfaces can be attached directly to a mesh or other flexible layer that is disposed over the material shown in FIG. 33 so that impact force on one of the rigid members causes deflection of the entire mesh or other layer for energy absorption prior to vibration absorption by the material; the section line labeled 12A-12A in this FIGURE signifies that it is possible that the support structure shown in FIG. 22 is generally the same as that illustrated in FIG. 12A;

FIG. 23 is a cross-sectional view of another embodiment of the material of the present invention and illustrates that the support structure can be positioned generally along an outer surface of the vibration dissipating material without departing from the scope of the present invention; FIG. 23 also illustrates that a breakable layer (i.e., a paper layer) or a self fusing adhesive layer can be located on one surface of the material; when a self fusing layer is located on one surface of the material, the material can be wrapped so as to allow multiple adjacent wrappings of the material to fuse together to form an integral piece; if desired, the integral piece may be waterproof for use with swimming or the like;

FIG. 24 is a cross-sectional view of another embodiment of the vibration dissipating material with a shrinkable layer of material disposed on a major surface thereof; the shrinkable material can be a heat shrinkable material or any other type of shrinking material suitable for use with the present invention; once the material is properly positioned, the shrinkable layer can be used to fix the material in position and, preferably, can also be used as a separate breakable layer to further dissipate vibration in a fashion similar to the breakable layer described in connection with FIG. 21;

FIG. 25 is another embodiment of the vibration dissipating material of the present invention and illustrates the shrinkable layer disposed within the vibration dissipating material; the shrinkable layer can be a solid layer, a perforated layer, a mesh or netting, or shrinkable fibers;

FIG. 26 is another embodiment of the vibration absorbing material of the present invention and illustrates the shrinkable layer being disposed over peaks of the support structure with an optional vibration absorbing layer thereover;

FIG. 27 is a cross-sectional view of the material of FIG. 26 when the shrinkable layer has been shrunk down over the support structure after the material is placed in a desired configuration; although the optional additional vibration absorbing material is not shown in FIG. 27, it can be left in position above the shrinkable layer to form a protective sheath or also pulled down into the gaps between the peaks of the support structure;

FIG. 28 is a cross-sectional view of another embodiment of the material of the invention;

FIG. 29 is a cross-sectional view of another embodiment of the material of the invention;

FIGS. 30 and 31 show variant embodiments of the material;

FIG. 32 shows a cross section of another material embodiment of the invention;

FIG. 33 shows a top view of the material of FIG. 32 with grooves formed therein;

FIG. 34 is a cross section of FIG. 33 along the lines 34-34;

FIG. 35 shows a top view of the material of FIG. 32 with grooves formed therein;

FIG. 36 is a cross section of FIG. 91 along the lines 92-92;

FIG. 37 is a partial side elevation of a baseball bat handle;

FIG. 38 is a cross-sectional view of the bat of FIG. 37 through the line 38-38;

FIG. 39 is a partial side elevation of a tennis racquet handle; and

FIG. 40 is a cross-sectional view of the bat of FIG. 39 through the line 40-40.

DETAILED DESCRIPTION OF THE PREFERRED EMBODIMENT(S)

The materials described herein can be used as soundproofing in many applications, for example, The StingFree Composite Technology can be used in all aspects of sound and vibration abatement Applications:

Industrial and Commercial Equipment
Heavy-Duty Machinery
Compressors, Generators, Pumps, Fans
Commercial Appliances and Equipment
HVAC Equipment
Precision Equipment/Electronics
Business Machines, Computers, Peripherals
Medical and Lab Equipment/Instruments
Telecommunications
Consumer Electronics And Appliances
Specialty Applications
Seating, Positioning, Pillows, Mattresses
Footwear
Athletic Equipment
Vehicle
Automotive and Truck
Marine and Aircraft
Bus, Coach, and RV
Personal Leisure Vehicles
Farm and Construction, Off-Highway What follows are descriptions of different embodiments of soundproofing materials.

Soundproofing Material Options

Figure 1:
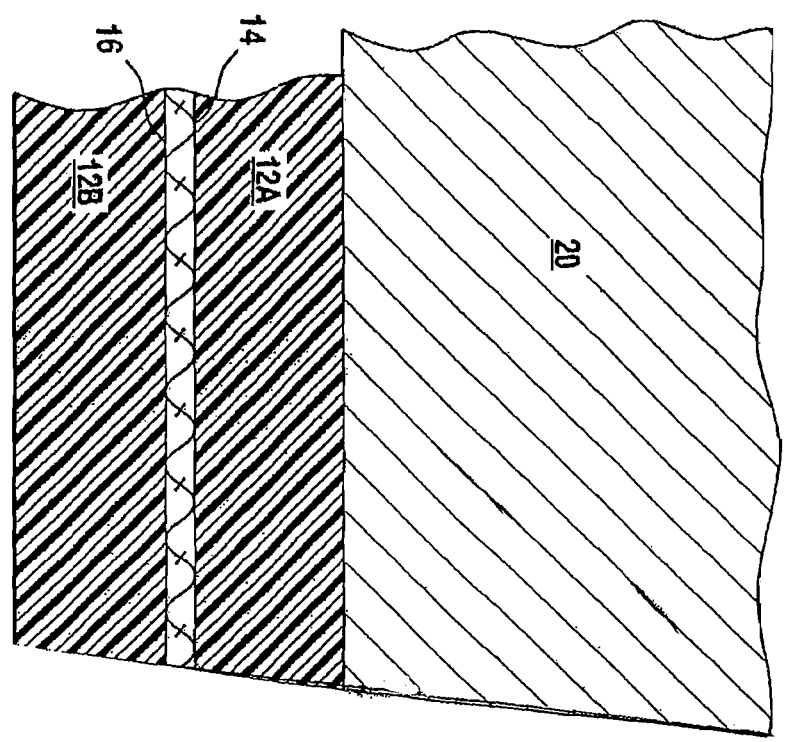
FIG. 1 is a cross-sectional view of a preferred embodiment of the material of the present invention.

Referring to FIG. 1, there is shown a preferred embodiment of a material adapted to regulate vibration according to the present invention, generally designated 10. Briefly stated, the material 10 of the present invention is formed by at least a first elastomer layer 12A and a layer of high tensile strength fibrous material 14. The material of the present invention can be used for soundproofing rooms, homes, airplanes, music studios, or the like.

The material 10 is preferably generally non elastic in a direction generally perpendicular "X" to a major material surface 316A (shown in FIG. 23) and thus, does not provide a spring like effect when experiencing impact force. It is preferred that the material 10 is generally compliant in the direction "X" which is perpendicular to the major material surface 316A, 316B so as to be generally non energy storing in the direction "X". It is preferred that the reinforcement layer generally distribute impact energy parallel to the major surfaces 316A, 316B and into the first and second elastomer layers 12A, 12B. The material 10 is preferably designed to reduce sensible vibration (and thus generally dampen and divert energy away from the object covered by the material).

The first elastomer layer 12A acts a shock absorber by converting mechanical vibrational energy into heat energy. The high tensile strength fibrous material layer 14 redirects vibrational energy and provides increased stiffness to the material 10 to aid in reducing noise through a wall 20 or the like that is fully, one-sides, or partially encased, by the material 10. It is preferred, but not necessary, that the high tensile strength fibrous material layer 14 be formed of aramid material.

In one embodiment, the composite material 10 may have three generally independent and separate layers including the first elastomer layer 12A and a second elastomer layer 12B. Elastomer material provides vibration damping by dissipating vibrational energy. Suitable elastomer materials include, but are not limited urethane rubbers, silicone rubbers, nitrile rubbers, butyl rubbers, acrylic rubbers, natural rubbers, styrene-butadiene rubbers, and the like. In general, any suitable elastomer material can be used to form the first and second elastomer layers without departing from the scope of the present invention. For example the elastomer layers may be thermoset elastomer layers. Alternatively, the elastomer layers 12A, 12B can be thermoplastic or any material suitable for thermoforming.

The material 10 can include additional layers thereover, such as a generally rigid material or the like. For example, one or more generally rigid plates of rigid material can be positioned over the material 10 to distribute impact force over an increased amount of the material.

The softness of elastomer materials can be quantified using Shore A durometer ratings. Generally speaking, the lower the durometer rating, the softer the material and the more effective an elastomer layer is at absorbing and dissipating vibration because less force is channeled through the elastomer.

It is preferable, but not necessary, that the elastomer used with the material 10 have a Shore A durometer of between approximately ten (10) and approximately eighty (80). It is preferred that the first elastomer layer have a Shore A durometer of between approximately ten (10) and approximately twenty-five (25) and that the second elastomer layer has a Shore A durometer of between approximately twenty-five (25) and approximately forty-five (45). The first elastomer layer 12A is preferably used to slow down impact energy and to absorb vibrational energy and to convert vibrational energy into heat energy. This preferably, but not necessarily, allows the first elastomer layer to act as a pad as well as dissipate vibration.

In one embodiment, the first elastomer layer 12A preferably has Shore A durometer of approximately fifteen (15) and the second elastomer layer has a Shore A durometer of approximately forty-two (42). If the first and second elastomer have generally the same Shore A durometer ratings, then it is preferable, but not necessary, that the first and second elastomer layers 12A, 12B have a Shore A durometer of fifteen (15), thirty-two (32), or forty-two (42).

The high tensile strength fibrous material layer 14 is preferably, but not necessarily, formed of aramid fibers. The fibers can be woven to form a cloth layer 16 that is disposed between and generally separates the first and second elastomer layers 12A, 12B. The cloth layer 16 can be formed of aramid fibers, high tensile strength fibers, fiberglass, or other types of fiber. It is preferred that the cloth layer 16 does not have suitable rigidity for use as an open gridwork having any significant energy storage capability. It is preferred that the material which forms the reinforcement layer 14 is generally bonded to the elastomer layers 12A, 12B. The cloth layer 16 preferably generally separates the first and second elastomer layers 12A, 12B causing the material 10 to have three generally distinct and separate layers 12A, 12B, 14. The high tensile strength fibrous material layer 14 blocks and redirects vibrational energy that passes through one of the elastomer layers 12A or 12B to facilitate the dissipation of vibrations. The high tensile strength fibers 18 redirect vibrational energy along the length of the fibers 18. Thus, when the plurality of high tensile strength fibers 18 are woven to form the cloth layer 16, vibrational energy emanating from the implement 20 that is not absorbed or dissipated by the first elastomer layer 12A is redistributed evenly along the material 10 by the cloth layer 16 and then further dissipated by the second elastomer layer 12B.

The cloth layer 16 is preferably generally interlocked in, generally affixed to, or generally fixed in position by the elastomer layers 12A, 12B in order for the cloth layer 16 to block and redirect vibrational energy to facilitate dissipation of vibrations.

It is preferable that the high tensile strength fibers 18 be formed of a suitable polyamide fiber of high tensile strength with a high resistance to elongation. However, those of ordinary skill in the art will appreciate from this disclosure that any aramid fiber suitable to channel vibration can be used to form the high tensile strength fibrous material layer 14 without departing from scope of the present invention. Additionally, those of ordinary skill in the art will appreciate from this disclosure that loose fibers or chopped fibers can be used to form the high tensile strength fibrous material layer 14 without departing from the scope of the present invention. The high tensile strength fibrous material may also be formed of fiberglass. The high tensile strength fibrous material preferably prevents the material 10 from substantially elongating in a direction parallel to the major material surfaces 316A, 316B during use. It is preferred that the amount of elongation is less than ten (10%) percent. It is more preferred that the amount of elongation is less than four (4%) percent. It is most preferred that the amount of elongation is less than one (1%) percent.

Those of ordinary skill in the art will appreciate from this disclosure that the material 10 can be formed of two independent layers without departing from the scope of the present invention. Accordingly, the material 10 can be formed of a first elastomer layer 12A and a high tensile strength fibrous material layer 14 (which may be woven into a cloth layer 16) that is disposed on the first elastomer 12A.

Figure 2:
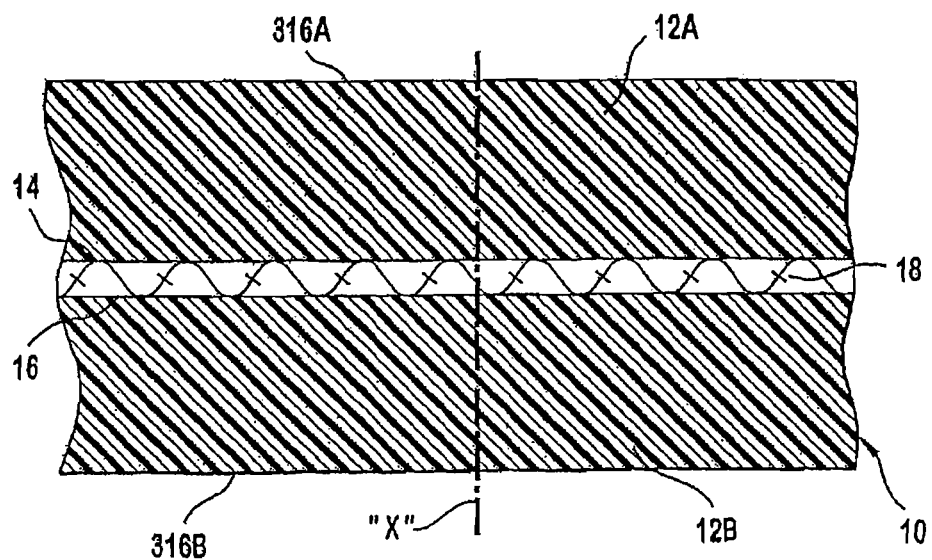
FIG. 2 is a cross-sectional view illustrating another embodiment of the material of the present invention.

Referring to the material 312 in FIG. 2, the material 312 is preferably generally planar and formed by a reinforced elastomer material 10 that regulates and dissipates vibration. The material 312 has first and second major surfaces 316A, 316B. The reinforced elastomer material 10 preferably includes first and second elastomer layers 12A, 12B. In one embodiment it is preferred that the first and second elastomer layers are generally free of voids therein and/or that the elastomer layers are formed by thermoset elastomer.

A reinforcement layer 14 is disposed between and generally separates the first and second elastomer layers 12A, 12B. The reinforcement layer 14 may include a layer formed of a plurality of high tensile strength fibrous material. Alternatively, the reinforcement layer may be formed of aramid, fiberglass, regular cloth, or the like. The reinforcement layer may be formed by woven fibers. In one embodiment, it is preferred that the reinforcement layer consist of only a single cloth layer of material.

The woven high tensile strength fibrous material is preferably connected to the first and second elastomer layers 12A, 12B generally uniformly throughout to provide substantially complete coverage between the first and second elastomer layers 12A, 12B. The cloth layer is generally compliant only in a direction "X" generally perpendicular to the first major surface 316A so as to be generally non energy storing in the direction "X". Wherein the high tensile strength fibrous material 14 generally distributes impact energy parallel to the first major surface 316A and into the first and second elastomer layers 12A, 12B.

Still referring to FIG. 2, the reinforced elastomer material 10 includes first and second elastomer layers 12A, 12B. A reinforcement layer 14 is disposed between and generally separates the first and second elastomer layers 12A, 12B. In some embodiments, the elastomer layer is generally free of voids and/or is a thermoset elastomer. The reinforcement layer 14 preferably includes a layer of high tensile strength fibrous material. The high tensile strength fibrous material can be woven into a cloth, chopped, or otherwise distributed. Instead of the reinforcement layer 14 being formed by high tensile strength fibrous material, the reinforcement layer 14 can be formed by a layer of fiberglass, aramid, or any other suitable material.

The high tensile strength fibrous material layer 14 is connected to the first and second elastomer layers 12A, 12B generally uniformly throughout to provide substantially complete coverage between the first and second elastomer layers. This preferably prevents sliding movement between the reinforcement layer 14 and the elastomer layers 12A, 12B. The cloth layer is preferably generally compliant only in the second direction "Z" so as to be generally non energy storing in the second direction "Z". The high tensile fibrous material generally distributes impact energy parallel to the first direction "Y" and into the first and second elastomer layers. This causes vibrational energy to be reduced and dampened rather than bounced back.

Alternatively, a cloth layer 16 can be pressured fit to an elastomer layer to form the material 10. Accordingly, the cloth layer 16 can be generally embedded in or held in place by the elastomer layer. The pressured fitting of the reinforcement layer, or fabric layer, 14 to an elastomer preferably results in the reinforcement layer, or fabric layer, 14 being generally interlocked in and/or bonded in position by the elastomer. Thus, the cloth layer can be generally interlocked with the elastomer layer. It is preferable that the high tensile strength cloth generally not be able to slide laterally between the first and second elastomer layers. The cloth layer in the resulting material would be generally fixed in position. One of ordinary skill in the art would realize that the cloth layer 14 in the resulting material would be generally interlocked and/or bonded in position by the elastomer 12A, 12B. Alternatively, the material 10 can be assembled by using adhesive or welding to secure the elastomer layer(s) to the reinforced layer.

It is preferred that the woven high tensile strength fibers are connected to the first and second elastomer layers generally uniformly throughout to provide substantially complete coverage between the first and second thermoset elastomer layers. The cloth layer is generally non energy storing in a direction generally perpendicular to a major material surface. This results in the vibrational energy being generally evenly redistributed throughout the material by the cloth layer. This is due to the high tensile strength fibers transmitting/storing energy unidirectionally along the length of the fiber and generally not storing energy in a direction generally perpendicular to the length of the fiber or perpendicular to a cloth layer formed by the fibers.

In other words, the cloth layer 16 is preferably compliant generally only in a direction generally perpendicular to a major material surface so as to be generally non energy storing in the direction perpendicular to the major material surface and to generally distribute energy parallel to the major material surface and into the first and second elastomer layers. The present invention preferably generally dissipates vibration throughout the material to prevent "bounce back."

In some cases the high tensile fibrous material can be pulped to form an imperforate sheet that may be secured in position between the first and second elastomer layers 12A, 12B. Those of ordinary skill in the art will appreciate from this disclosure that any known method of making composite or vibration dissipating materials can be used to form the material 10.

Figure 3:
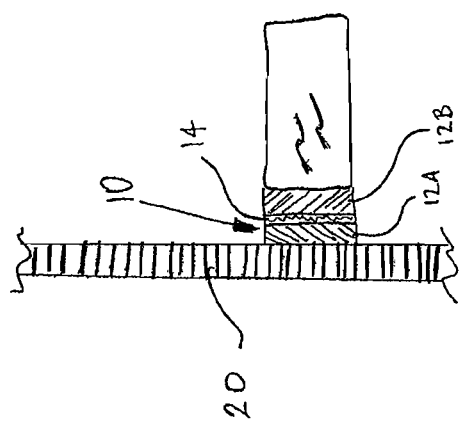
FIG. 3 is a cross-sectional view of a material used as a padding between a wall and a mounting stud.

FIG. 3 shows a cross section of the use of one embodiment of the material 10 (understanding that any of the embodiments herein could be used) between a wall 20 of for example a room, and a stud 20A that the wall is mounted upon. (It should be understood that FIG. 3 is not necessarily drawn to scale). In FIG. 3, the material 10 acts to absorb, dissipate, and/or isolate vibrations through the wall 20 and thus minimize sound passage from one side of the wall 20 to the other.

Figure 4:
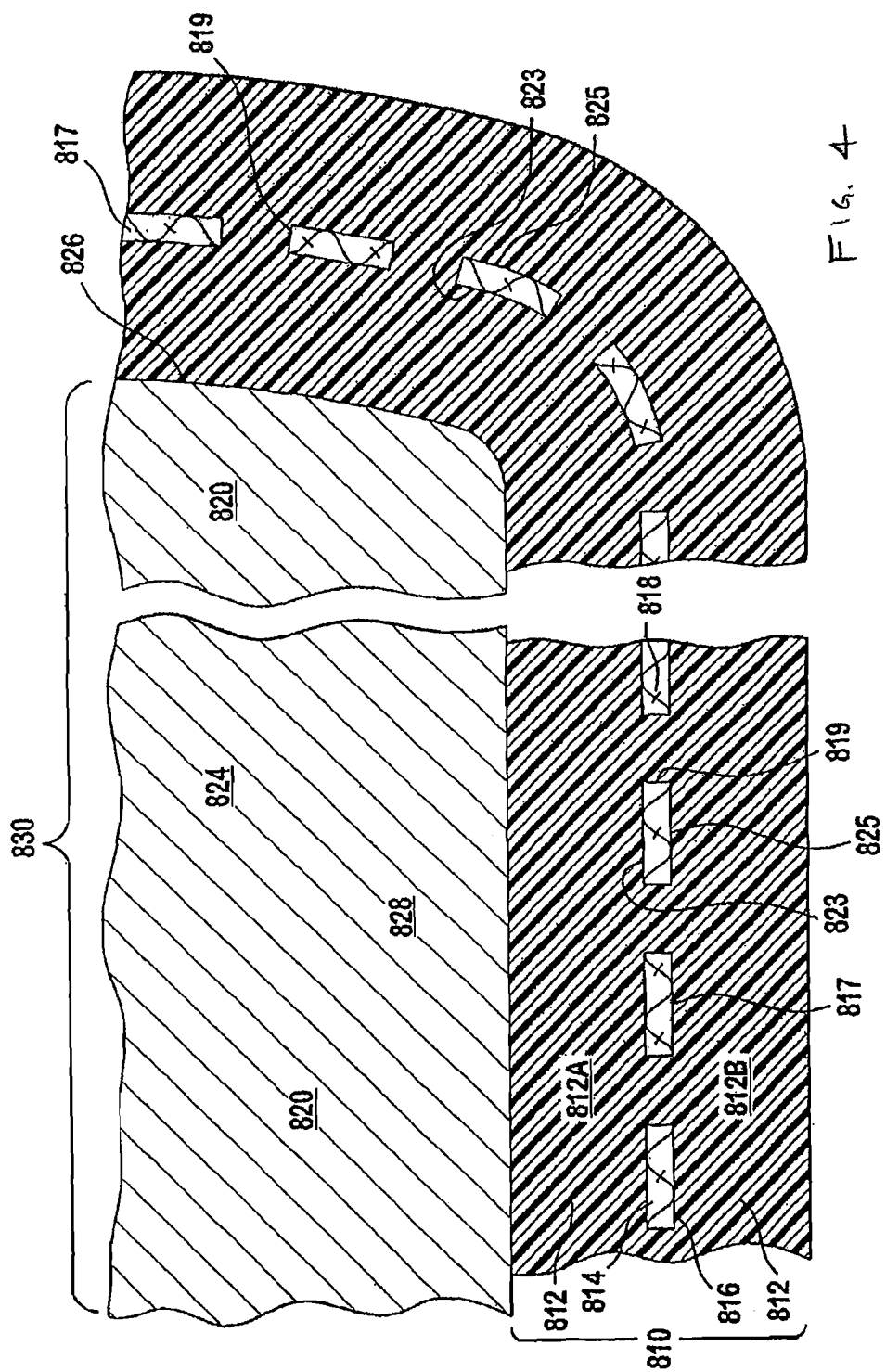
FIG. 4 is a cross-sectional view of another embodiment of the material of the present invention illustrating a single layer vibration dissipating material with a support structure embedded therein.
Figure 5:
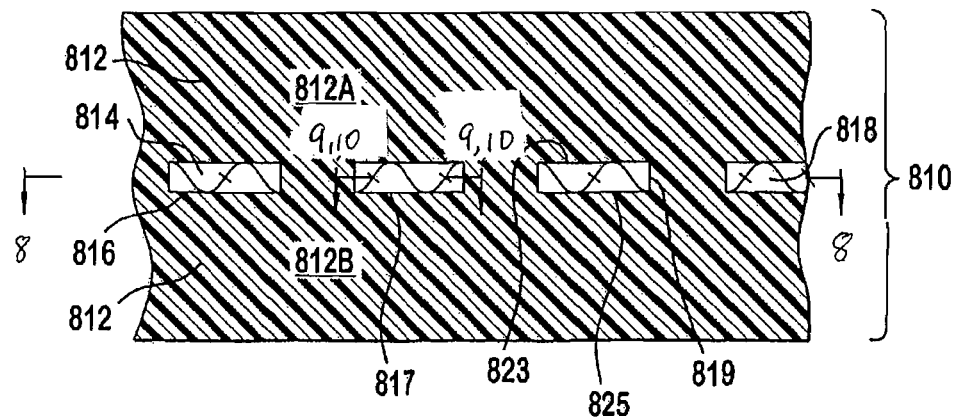
FIG. 5 is a cross-sectional view of the material of FIG. 4.

With reference to FIGS. 4-11 in particular, it is preferred that the material 810 have a single contiguous elastomer body 812. Referring to FIG. 4, the support structure has first and second major surfaces 823, 825. In one embodiment, the elastomer 812 extends through the support structure 817 so that the portion of the elastomer 812A contacting the first major support structure surface 823 (i.e., the top of the support structure 817) and the portion of the elastomer 812B contacting the second major support structure surface 825 (i.e., the bottom of the support structure) form the single contiguous elastomer body 812. Elastomer material provides vibration damping by dissipating vibrational energy. Suitable elastomer materials include, but are not limited, urethane rubbers, silicone rubbers, nitrile rubbers, butyl rubbers, acrylic rubbers, natural rubbers, styrene-butadiene rubbers, and the like. In general, any suitable elastomer or polymer material can be used to form the vibration dissipating layer 812.

Referring to FIGS. 5-11, the support structure 817 can be any one (or combination of) of a polymer, an elastomer, a plurality of fibers, a plurality of woven fibers, and a cloth. If the support structure 817 and the layer 812 are both polymers or both elastomers, then they can be the same or different from each other without departing from the scope of the present invention. If vibration dissipating material is 812 if formed of the same material as the support structure 817, then the support structure 817 can be made more rigid than the main layer 812 by embedding fibers 814 therein. It is preferable that the support structure 817 is generally more rigid than the vibration dissipating material 812.

Referring specifically to FIG. 8, the support structure 817 may be formed of an elastomer that may but does not necessarily, also have fibers 814 embedded therein. Referring to FIG. 9, the support structure 817 may be formed by a plurality of woven fibers 818. Referring to FIG. 10, the support structure 817 may be formed by a plurality of fibers 814. Regardless of the material forming the support structure 817, it is preferable that passageways 819 extend into the support structure 817 to allow the elastomer 812 to penetrate and embed the support structure 817. The term "embed," as used in the claim and in the corresponding portions of the specification, means "contact sufficiently to secure thereon and/or therein."

Figure 6:
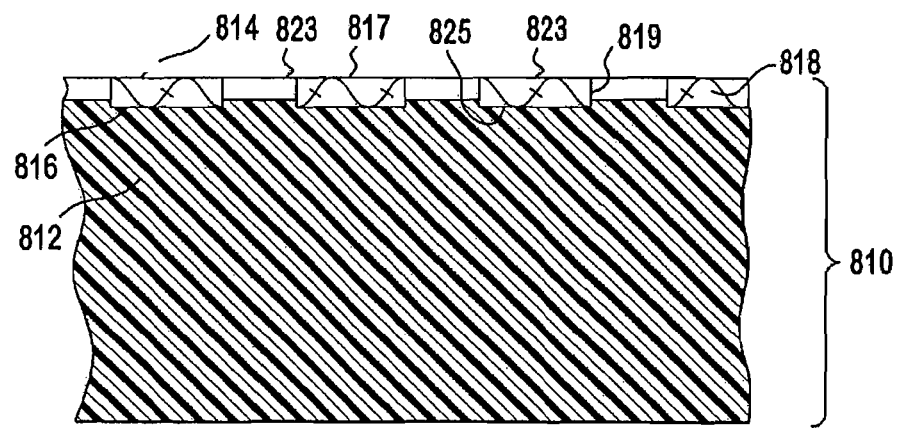
FIG. 6 is a cross-sectional view of another embodiment of the material of the present invention with the support structure embedded thereon and the vibration dissipating material penetrating the support structure.
Figure 7:
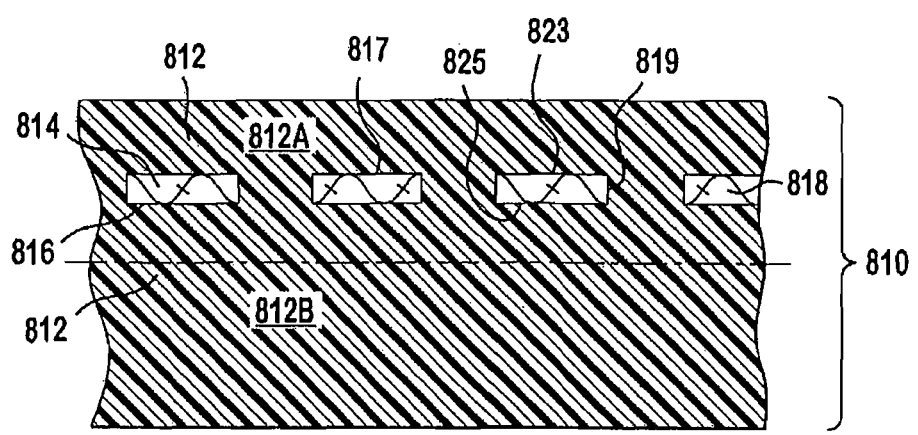
FIG. 7 is cross-sectional view of another embodiment of the material of the present invention with the support structure embedded within the vibration dissipating material and the vibration dissipating material penetrating the support structure, the support structure is positioned off center within the vibration dissipating material.

Accordingly, the support structure 817 shown in FIG. 6 is embedded by the elastomer 812 even though the elastomer 812 does not fully enclose the support structure 817. Additionally, as shown in FIG. 7, the support structure 817 can be located at any level or height within the elastomer 812 without departing from the scope of the present invention. While the passageways 819 are shown as extending completely through the support structure 817, the invention includes passageways 819 that extend partially through the support structure 817.

Referring again to FIG. 6, in one embodiment, it is preferred that the support structure 817 be embedded on the elastomer 812, with the elastomer penetrating the support structure 817. The support structure 817 being generally along a major material surface 838 (i.e., the support structure 817 is generally along the top of the material).

The fibers 814 are preferably, but not necessarily, formed of aramid fibers. Referring to FIG. 9, the fibers 814 can be woven to form a cloth 816 that is disposed on and/or within the elastomer 812. The cloth layer 816 can be formed of woven aramid fibers or other types of fiber. The aramid fibers 814 block and redirect vibrational energy that passes through the elastomer 812 to facilitate the dissipation of vibrations. The aramid fibers 818 redirect vibrational energy along the length of the fibers 818. Thus, when the plurality of aramid fibers 818 are woven to form the cloth 816, vibrational energy emanating from the implement 820 that is not absorbed or dissipated by the elastomer layer 812 is redistributed evenly along the material 810 by the cloth 816 and preferably also further dissipated by the cloth 816.

It is preferable that the aramid fibers 818 are formed of a suitable polyamide fiber of high tensile strength with a high resistance to elongation. However, those of ordinary skill in the art will appreciate from this disclosure that any aramid fiber suitable to channel vibration can be used to form the support structure 817 without departing from scope of the present invention. Additionally, those of ordinary skill in the art will appreciate from this disclosure that loose aramid fibers or chopped aramid fibers can be used to form the support structure 817 without departing from the scope of the present invention. The aramid fibers may also be formed of fiberglass or the like.

When the aramid fibers 818 are woven to form the cloth 816, it is preferable that the cloth 816 include at least some floating aramid fibers 818. That is, it is preferable that at least some of the plurality of aramid fibers 818 are able to move relative to the remaining aramid fibers 818 of the cloth 816. This movement of some of the aramid fibers 818 relative to the remaining fibers of the cloth converts vibrational energy to heat energy.

With reference to FIGS. 12-12A, the elastomer layer 912 acts as a shock absorber by converting mechanical vibrational energy into heat energy. The embedded support structure 917 redirects vibrational energy and provides increased stiffness to the material 910 to facilitate noise resistance through the wall or material 920 encased, or partially encased, by the material 910. The elastomer layer 912, 912A, or 912B may include a plurality of fibers 914 (further described below) or a plurality of particles 915 (further described below). The incorporation of the support structure 917 on and/or within the material 910 allows the material 910 to be formed by a single elastomer layer without the material 910 being unsuitable for at least some of the above-mentioned uses. The support structure 917 may also include a plurality of fibers 914 or a plurality of particles 915.

In the situation where the support structure 917 is formed by a second elastomer layer, the two elastomer layers can be secured together via an adhesive layer, discreet adhesive locations, or using any other suitable method to secure the layers together. Regardless of the material used to form the support structure 917, the support structure is preferably located and configured to support the first elastomer layer (see FIGS. 12A-12C).

It is preferred that the material 910 have a single contiguous elastomer body 912. Referring to FIG. 12, the support structure has first and second major surfaces 923, 925. In one embodiment, the elastomer 912 extends through the support structure 917 so that the portion of the elastomer 912A contacting the first major support structure surface 923 (i.e., the top of the support structure 917) and the portion of the elastomer 912B contacting the second major support structure surface 925 (i.e., the bottom of the support structure) form the single contiguous elastomer body 912. Elastomer material provides vibration damping by dissipating vibrational energy. Suitable elastomer materials include, but are not limited, urethane rubbers, silicone rubbers, nitrile rubbers, butyl rubbers, acrylic rubbers, natural rubbers, styrene-butadiene rubbers, and the like. In general, any suitable elastomer or polymer material can be used to form the vibration dissipating layer 912.

Figure 12B:
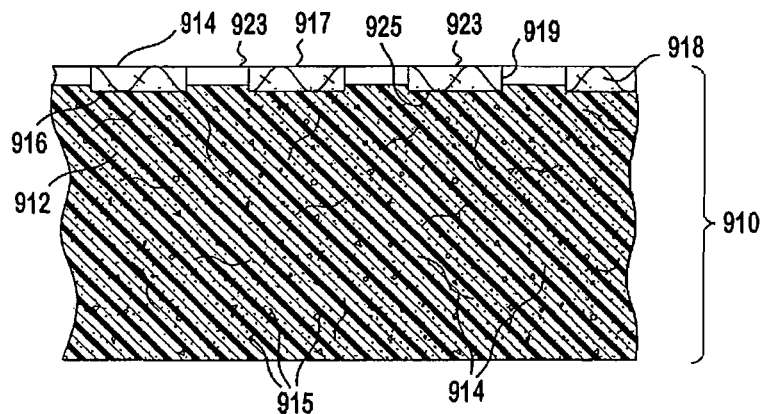
FIG. 12B is a cross-sectional view of another embodiment of the material of the present invention with the support structure embedded thereon and the vibration dissipating material penetrating the support structure.
Figure 12C:
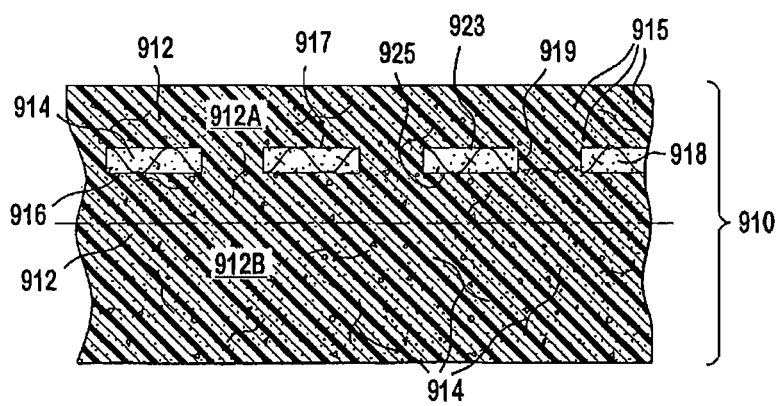
FIG. 12C is cross-sectional view of another embodiment of the material of the present invention with the support structure embedded within the vibration dissipating material and the vibration dissipating material penetrating the support structure, the support structure is positioned off center within the vibration dissipating material.

Referring to FIG. 12B, in one embodiment, it is preferred that the support structure 917 be embedded on the elastomer 912, with the elastomer penetrating the support structure 917. The support structure 917 being generally along a major material surface 938 (i.e., the support structure 917 is generally along the top of the material).

The fibers 914 are preferably, but not necessarily, formed of aramid fibers. However, the fibers can be formed from any one or combination of the following: bamboo, glass, metal, elastomer, polymer, ceramics, corn husks, and/or any other renewable resource. By using fibers from renewable resources, production costs can be reduced and the environmental friendliness of the present invention can be increased.

Particles 915 can be located in either an elastomer layer 912, 912A, and/or 912B and/or in the support structure 915. The particles 915 increase the vibration absorption of the material of the present invention. The particles 915 can be formed of pieces of glass, polymer, elastomer, chopped aramid, ceramic, chopped fibers, sand, gel, foam, metal, mineral, glass beads, or the like. Gel particles 915 provide excellent vibration dampening due their low durometer rating. One exemplary gel that is suitable for use the present invention is silicone gel. However, any suitable gel can be used without departing from the present invention.

In addition to use with implements, sleeves, covers, and the like described above, the material can be used as an athletic tape, padding, bracing material, or the like.

FIGS. 13 and 15 illustrate another embodiment of the material of the present invention in the first and second positions, respectively. FIGS. 16 and 17 illustrate an alternative embodiment of the material of the present invention in the first and second positions, respectively.

The tape body 64 preferably includes a first elastomer layer 12 that defines a tape length 66, as measured along the longitudinal axis 48, of the tape body 64. The support structure 17 is preferably disposed within the elastomer layer 12 generally along the longitudinal axis 48 in an at least partially non linear fashion while the tape body is in the first position so that a length of the support structure 17, as measured along a surface thereof, is greater than the tape length 66 of the first elastomer layer 12. It is preferred, by not necessary, that the support structure 17 (or ribbon material) is positioned in a generally sinusoidal fashion within the elastomer layer 12 while the tape body 64 is in the first position. However, the support structure 17 can be positioned in an irregular fashion without departing from the scope of the present invention. As described above, the support structure 17 and/or the elastomer layer 12 can include particles, fibers, or the like.

Referring to FIGS. 15 and 17, when the tape body 64 is stretched into the second position, the support structure 17 is preferably at least partially straightened so that the support structure 17 is more linear (or in the case of other materials, the support structure 17 would likely be thinner), relative to when the tape body 64 is in the first position. The straightening of the support structure causes energy to be dissipated and preferably generally prevents further elongation of the elastomer layer 12 along the longitudinal axis 48 past the second position. Energy dissipation occurs due to the stretching of the material of the support structure 17 and can occur due to the separation or partial pulling away of the support structure 17 from the attached elastomer layer 12.

Referring to FIG. 14, the "overall support structure" 17 may comprise a plurality of stacked support structures, fibers 18, and/or cloth layers 16. It is preferred that the plurality of fibers include aramid fibers or other high tensile strength fibrous material. Alternatively, the plurality of fibers may be formed of fiberglass material or be woven into a ribbon or cloth. The support structure can include any one (or combination) of a polymer, an elastomer, particles; fibers; woven fibers; a cloth; a plurality of cloth layers; loose fibers, chopped fibers, gel particles, particles, sand, or the like without departing from the scope of the present invention.

As detailed above, the support structure 17 and/or the elastomer layer 12 may include a plurality of particles therein. Such particles may include any one or combination of gel particles, sand particles, glass beads, chopped fibers, metal particles, foam particles, sand, or any other particle in parting desirable vibration dissipation characteristics to the material 10.

Referring to FIGS. 13 and 14, it is preferred that the tape body 64 have top and bottom surfaces 68A, 68B, respectively. The bottom surface 68B faces the wall when the tape 710 is attached thereto. When the support structure 717 is formed by a plurality of fibers 718, it is preferable that the plurality of fibers 718 define multiple stacked fiber layers between the top and bottom surfaces 768A, 768B. It is preferable that the plurality of fibers 718 are stacked between four (4) and sixteen (16) times between the top and bottom surfaces 768A, 768B. It is more preferable still that the plurality of fibers are stacked ten (10) times. As described above, the plurality of fibers 718 may include metal fibers, high tensile strength fibrous material, ceramic fibers, polymer fibers, elastomer fibers, or the like without departing from the scope of the present invention. As shown in FIG. 14, the support structure 717 may be disposed only partially within or on the elastomer layer generally along the longitudinal axis without departing from the scope of the present invention.

Referring again to FIGS. 13-17, the material of the present invention can be an all purpose material for use as desired by a person to regulate energy by distributing and partially dissipating energy exerted thereon. When the material 710 of the present is used as an all purpose material, the all purpose material 710 includes a material body 770 that is elongateable along the stretch axis 750 from a first position (shown in FIGS. 13 and 16) to a second position (shown in FIGS. 14 and 17), in which the material body 770 is elongated by a predetermined amount relative to the first position. The stretch axis 750 is preferably determined during manufacturing by the orientation and geometry of the support structure 717 which preferably limits the directions in which the material body 770 can elongate. If multiple separate material bodies 770 are stacked together, it may be desirable to have the stretch axis 750 of the individual material bodies 770 oriented askew from each other.

The first elastomer layer 712 defines a material length 772, as measured along the stretch axis 750 of the material body 770. The support structure 717 is preferably disposed within the elastomer layer 712 generally along the stretch axis 750 in an at least partially non linear fashion while the material body 770 is in the first position so that a length of the support structure, as measured along the surface thereof, is greater than the material length 772 of the first elastomer layer. When the material body 770 is elongated into the second position, the support structure 717 is at least partially straightened so that the support structure is more linear, relative to when the material body 770 is in the first position.

The support structure 717 is preferably positioned in a sinusoidal fashion within any of the materials 710 of the present invention. The support structure 717 or ribbon may also be positioned in the form of a triangular wave, square wave, or an irregular fashion without departing from the scope of the present invention.

Any of the materials of the present invention may be formed with an elastomer layer 712 formed by silicone or any other suitable material. Depending upon the application, the vibration absorbing material 712 may be a thermoset and/or may be free of voids therein.

Any of the embodiments of the material 710 can be used as an implement cover, grip, athletic tape, an all purpose material, a brace, and/or padding. When the material 710 of the present invention is used as part of a padding, the padding includes a padding body 774 that is elongateable along the stretch axis from a first position to a second position, in which the padding body 774 is elongated by a predetermined amount relative to the first position. The padding includes a first elastomer layer 712 which defines a padding length 776, as measured along the stretch axis 750 of the padding body 774.

The support structure 717 is disposed within the elastomer layer 712 generally along the stretch axis 750 in an at least partially non linear fashion while the padding body 774 is in the first position so that a length of the support structure 717, is measured along a surface thereof, is greater than the padding length 776 of the first elastomer layer 712. When the padding body 774 is elongated into the second position, the support structure 717 is at least partially straightened so that the support structure is more linear, relative to when the padding body 774 is in the first position. The straightening of the support structure 717 causes energy to be dissipated and generally prevents further elongation of the elastomer layer along the stretch axis 750 past the second position.

When the materials 710 of the present invention are incorporated as part of a brace, the brace provides a controlled support for a wrapped portion of a person's body. The brace includes a brace body 778 that is elongateable along the stretch axis 750 from a first position to a second position, in which the brace body 778 is elongated by a predetermined amount relative to the first position. The brace body includes a first elastomer layer 712 that defines a brace length 780, as measured along the stretch axis 750, of the brace body 778.

The support structure 717 is preferably disposed within the elastomer layer generally along the stretch axis 750 in an at least partially non linear fashion while the brace body 778 is in the first position so that a length of the support structure 717, as measured along a surface thereof, is greater than the brace length 780 of the first elastomer layer 712. When the brace body 778 is stretched into the second position, the support structure 717 is at least partially straightened so that the support structure 717 is more linear, relative to when the brace body 778 is in the first position. The straightening of the support structure 717 causes energy to be dissipated and preferably generally prevents further elongation of the elastomer layer 712 along the stretch axis past the second position. Those ordinarily skilled in the art will appreciate that any of the materials 710 of the present invention may be formed into a one piece brace that provides a controlled support as described above without departing from the scope of the present invention.

Referring to FIGS. 13 and 16, depending upon the geometry of the support structure 717 when the material 710 is in the first position, the amount of stretch of the material 710 can be selected. It is preferred that the percentage increase in the material length when the body 764, 770, 774, 778 moves from the first position to the second position is selected based on a desired range of motion.

Referring to FIGS. 18, 19, and 21, adhesive 52 may be used to connect the support structure 717 to the vibration absorbing material 712. Referring to FIGS. 19-21, air gaps 760 can be present proximate to the support structure 717 without departing from the scope of the present invention. Referring to FIG. 19, the material can be secured at its peak 762 to the vibrating absorbing material 712 or can be secured only at its ends with the vibration absorbing material 712 forming a protective sheath for the support structure 717 which would act as an elastic member in this instance.

FIGS. 24-27 illustrate the material 710 of the present invention incorporating a shrink layer 758 which can be used to secure the material 710 in position. Additionally, the shrinkable layer 758 may be configured to break when a certain stress threshold is reached to provide further energy dissipation. Referring to FIG. 26, a shrinkable layer 758 is in its pre-shrink configuration. Referring to FIG. 27, once the shrinkable layer 758 has been activated, the shrinkable layer 758 preferably deforms about one side of the support structure 717 to hold the material 710 in position. The shrinkable layer 758 can be heat or water activated. Alternative known activation methods are also suitable for use with the present invention.

FIG. 21 illustrates another embodiment of the present invention in which the vibration absorbing layer 712 is configured to break apart during the elongation of the support structure 717 to allow for greater energy dissipation.

Any of the materials 710 of the present invention can be used in conjunction with additional layers of rigid or flexible materials without departing from the scope of the present invention. For example, the materials 710 of the present invention may be used with a hard shell outer layer which is designed to dissipate impact energy over the entire material 710 prior to the material 710 deforming to dissipate energy. One type of rigid material that can be used in combination with the materials 710 of the present invention is molded foam. Molded foam layers preferably include multiple flex seams that allow portions of the foam layer to at least partially move relative to each other even though the overall foam layer is a single body of material. This is ideal for turning an impact force into a more general blunt force that is spread over a larger area of the material 710. Alternatively, individual foam pieces, buttons, rigid squares, or the like can be directly attached to an outer surface of any of the materials 710 of the present invention. Alternatively, such foam pieces, buttons, rigid squares, or the like can be attached to a flexible layer or fabric that will dissipate received impact energy over the length of the fabric fibers prior to the dissipation of energy by the material 710.

FIGS. 28 and 29, show yet another embodiment of the inventive material of the invention, in which the material comprises two aramid layers 1010, 1012 with an elastomeric layer 1020 therebetween. The applicant has found that this configuration is an effective padding for high weight or impact resistant configurations because the aramid material layers 1010, 1012, resist impact and discourage displacement of the elastomeric layer 1020. This allows for the use of very low durometer elastomers, rubbers, and gels, with durometers in the hundred to thousand ranges while still providing excellent stability.

Alternately, rather than using aramid layers, other fibers could be used, including high tensile strength fibers. As a further embodiment, a material could be used comprising an aramid and first elastomer layer, separated by a second elastomer.

While other high tensile strength materials could be used, aramids with a tensile modulus of between 70 and 140 GPa are preferred, and nylons such as those with a tensile strength of between 6,000 and 24,000 psi are also preferred. Other material layers and fibers could substitute for the aramid layers 1010, 1012; in particular, low tensile strength fibers could be combined with higher tensile strength fibers to yield layers 1010, 1012 that would be suitable to stabilize and contain the elastomeric layer 1020. For example, cotton, kenaf, hemp, flax, jute, and sisal could be combined with certain combinations of high tensile strength fibers to form the supportive layers 1010, 1012.

In use, the first and second aramid material layers 1010, 1012 are preferably coated with a bonding layer 1010a, 1010b, 1012a, 1012b, preferably of the same material as the elastomeric material that facilitates bonding between the aramid layers 1010, 1012 and the elastomeric layer 1020, although these bonding layers are not required. Further, although equal amounts of the bonding layers 1010a, 1010b, 1012a, 1012b are shown on either side of the aramid layers 1010, 1012, the bonding layers 1010a, 1010b, 1012a, 1012b need not be evenly distributed over the aramid layers 1010, 1012.

The applicant has observed that the aramid layers 1010, 1012 distribute impact and vibration over a larger surface area of the elastomeric layer 1020. This finding has suggested using the material in heavier impact applications, such as using it as a motor mount 1030 or flooring 1035, 1037, since the aramid layers 1010, 1012 will discourage displacement of the elastomeric layer 1020, while still absorbing much of the vibration in those applications. This property could be useful in many of the above-noted applications, and in particular in impact absorbing padding, packaging, electronics padding, noise reducing panels, tape, carpet padding, and floor padding.

In use, this material can be used as a flooring 1037, as shown in FIG. 31.

FIGS. 33-36 show another material for use with the invention. The cross-section of FIG. 34 shows the layers of the material, which comprise a foam layer 1110, aramid layer 1112, and elastomeric layer 1114. The foam layer 1110 is a generally rigid layer of foam that the applicant has found is particular good at dissipating a point impact, and thus has been found particular suited for impact and vibration resistance. It should be understood that the elastomeric layer 1114 is generally adjacent to, or substantially adjacent to the body being protected from impact.

The foam layer 1110 is preferably rigid and inflexible, although softer foam layers may be used. The rigid foam layers 1110 present a problem in that many impact-resistant applications require flexible material, i.e., machine soundproofing. The applicant solved this problem by forming narrow areas of weakness 1111 in the foam layer. These areas can be formed by cutting, stamping, or forming the area of predetermined weakness, but in any event, the allow for the foam layer 1110 to bend at these areas 1111. Various shapes of the areas of predetermined weakness could be used depending on the needed flexibility. As shown, parallel, hexagonal, and herringbone (diamond) areas are presently preferred.

Finally, the applicant has found that a fourth rigid layer comprising plastic, foam, or metal, could be added over the foam/aramid/elastomer to further dissipate impact energy.

It is recognized by those skilled in the art, that changes may be made to the above-described embodiments of the invention without departing from the broad inventive concept thereof. For example, the material 10 may include additional layers (e.g., five or more layers) without departing from the scope of the claimed present invention. It is understood, therefore, that this invention is not limited to the particular embodiments disclosed, but is intended to cover all modifications which are within the spirit and scope of the invention as defined by the appended claims and/or shown in the attached drawings.

Use as Soundproofing

The following description applies generally to many of the materials described above, but is specifically with reference to FIG. 1. The first elastomer layer 12A converts sound and vibrational energy waves into heat energy through hysteric damping, as most traditional damping materials do. As the energy waves travel through the elastomer 12A, they reach the end of the medium and interface with the high tensile strength fibrous material layer 14. The area of interface is commonly referred to as a boundary. The high tensile strength material 14 has the unique ability to radiate or carry the vibrational energy waves away from the point of entry, in addition to providing increased stiffness to the composite. Thus, when the plurality of high tensile strength fibers 18 are woven to form the cloth layer 16, vibrational energy that is not absorbed or dissipated by the first elastomer layer 12A is redistributed evenly along the material 10 by the cloth layer 16 and then further dissipated by the second elastomer layer 12B. This spreading of the energy waves over a large area by the high tensile strength fibrous layer 14, normally referred to as mechanical radiation damping, is what makes the composite so efficient at energy dissipation.

In addition to the mechanical radiation damping provided by the high tensile strength fibrous layer 14, the boundaries between the elastomer layers 12A and 12B and the high tensile strength fibrous layer 14 create several additional operative mechanisms for energy dissipation. These beneficial boundary effects include, but are not limited to reflection, transformation, dispersion, refraction, diffraction, transformation, friction, wave interference, and hysteric damping. The combination of these dissipation mechanisms working simultaneously results in a material with extremely efficient damping characteristics compared to traditional materials of the same or greater thickness.

The material 10 can include different numbers of layers, as well as varying orders of the layers compared to the base composite shown. Materials can be added to the composite such as sheet metal to aid in the absorption of specific frequencies and wave lengths of vibration energy or to add strength. Those of ordinary skill in the art will appreciate from this disclosure that the material 10 can be formed of two independent layers without departing from the scope of the present invention. Accordingly, the material 10 can be formed of a first elastomer layer 12A and a high tensile strength fibrous material layer 14, which may be woven into a cloth layer 16, that is disposed on the first elastomer 12A.

FIG. 37 is a partial side elevation of a baseball bat handle 1120. Any one of the appropriate combinations of the material embodiments described above can be inserted into the baseball bat handle 1120. Once inserted into the handle 1120 (As shown) or other sections of the bat, the material acts to both reduce vibration and sound travel through the bat.

In the cross sectional view through the bat handle 1120 in FIG. 38, the material has the same cross section as that discussed with respect to FIG. 1, located within the handle's cross section 1122 that defines a cavity to contain the material 10.

FIGS. 39 and 40 show a similar elevation and cross section of a tennis racquet 1120 and its section 1222.

It should be understood that what is shown in FIGS. 37-40 are two possible configurations using the material within the handles of sporting apparatuses. Similar uses would be within golf club handles and heads, hockey sticks, lacrosse sticks, and the like. Outside of the sporting arena, the material could be used in hand or power tools or similar hand-gripped items.

FIG. 38 is a cross-sectional view of the bat of FIG. 37 through the line 38-38;

FIG. 39 is a partial side elevation of a tennis racquet handle; and

FIG. 40 is a cross-sectional view of the bat of FIG. 39 through the line 40-40.

Having thus described in detail several embodiments of the present invention, it is to be appreciated and will be apparent to those skilled in the art that many physical changes, only a few of which are exemplified in the detailed description of the invention, could be made without altering the inventive concepts and principles embodied therein. It is also to be appreciated that numerous embodiments incorporating only part of the preferred embodiment are possible which do not alter, with respect to those parts, the inventive concepts and principles embodied therein. The present embodiments and optional configurations are therefore to be considered in all respects as exemplary and/or illustrative and not restrictive, the scope of the invention being indicated by the appended claims rather than by the foregoing description, and all alternate embodiments and changes to this embodiment which come within the meaning and range of equivalency of said claims are therefore to be embraced therein.

What is claimed is:

1. A sound dissipating material comprising:
   first and second elastomer layers, the first elastomer layer defining a first major surface and the second elastomer layer defining a second major surface generally parallel to the first major surface; and
   a reinforcement layer disposed between and generally separating the first and second elastomer layer, the reinforcement layer comprising a layer of high tensile strength fibrous material with at least some floating fibers, the reinforcement layer being generally compliant only in a direction generally perpendicular to the first and second major surfaces so as to be generally non energy storing in the direction wherein the reinforcement layer generally distributes impact energy parallel to the first and second major surfaces and into the first and second elastomer layers.

2. The sound dissipating material of claim 1, wherein the layer of high tensile strength fibrous material is a woven sheet.

3. The sound dissipating material of claim 1, wherein the layer of high tensile strength fibrous material is formed by a single cloth sheet.

4. A baseball bat with at least a portion of the bat defining a cavity therein, said cavity comprising the material of claim 1.

5. A tennis racquet with at least a portion of the racquet defining a cavity therein, said cavity comprising the material of claim 1.

6. A hand-gripped implement with at least a portion of the implement defining a cavity therein, said cavity comprising the material of claim 1.

\* \* \* \* \*